United States Patent
Goetz et al.

(10) Patent No.: US 9,489,395 B2
(45) Date of Patent: *Nov. 8, 2016

(54) SYSTEM AND METHOD FOR EXPOSING CLOUD STORED DATA TO A CONTENT DELIVERY NETWORK

(71) Applicant: Rackspace US, Inc., San Antonio, TX (US)

(72) Inventors: David Patrick Goetz, San Antonio, TX (US); Gregory Lee Holt, Hollywood Park, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,040

(22) Filed: Apr. 17, 2015

(65) Prior Publication Data

US 2015/0220561 A1 Aug. 6, 2015

Related U.S. Application Data

(63) Continuation of application No. 13/653,208, filed on Oct. 16, 2012, now Pat. No. 9,015,212.

(51) Int. Cl.
*G06F 17/30* (2006.01)
*G06F 3/06* (2006.01)
*H04L 29/08* (2006.01)

(52) U.S. Cl.
CPC ......... *G06F 17/30194* (2013.01); *G06F 3/067* (2013.01); *G06F 3/0611* (2013.01);
(Continued)

(58) Field of Classification Search
CPC ............ G06F 17/30194; G06F 17/30; G06F 17/30174; G06F 17/30182; G06F 3/0644; G06F 3/067; G06F 3/0611; G06F 17/30241; G06F 17/30575; G06F 17/30126; G06F 17/30144; H04L 67/1095; H04L 67/06; H04L 65/10; H04L 67/10; H04L 43/0817; H04L 67/02; H04L 67/2842; H04N 21/23106
USPC ........ 707/827, E17.032, 620, 628, 652, 610, 707/638, 694, 654, 624, E17.01, E17.002, 707/E17.007, 792, E17.014, 692; 711/163, 711/166, 156, 162, 170, E12.001, E12.108; 713/193, 161, 168, 176, 400, 503; 726/1, 4, 16; 709/217, 220, 224, 226, 709/206, 203, 230, 231, 218, 219
See application file for complete search history.

(56) References Cited

U.S. PATENT DOCUMENTS

| | | | |
|---|---|---|---|
| 5,873,097 A | 2/1999 | Harris et al. | |
| 7,047,241 B1 * | 5/2006 | Erickson | G06F 21/10 713/176 |

(Continued)

OTHER PUBLICATIONS

Hweehwa Pang, Tan, K. L—"Authenticating query results in edge computing"—Published in: Data Engineering. 2004. Proceedings, 20th International Conference on—Date of Conference: Mar. 30-Apr. 2, 2004 pp. 560-571.

(Continued)

*Primary Examiner* — Anh Ly
(74) *Attorney, Agent, or Firm* — Haynes and Boone, LLP

(57) ABSTRACT

A system for exposing data stored in a cloud computing system to a content delivery network provider includes a database configured to receive and store metadata about the data, the database being implemented in the cloud computing system to store configuration metadata for the data related to the content delivery network, and an origin server configured to receive requests for the data from the content delivery network provider, and configured to provide the data to the content delivery network provider based on the metadata.

18 Claims, 15 Drawing Sheets

(52) U.S. Cl.
CPC ............. *G06F3/0644* (2013.01); *G06F 17/30* (2013.01); *G06F 17/30174* (2013.01); *G06F 17/30182* (2013.01); *H04L 67/02* (2013.01); *H04L 67/10* (2013.01); *H04L 67/1095* (2013.01); *H04L 67/2842* (2013.01)

(56) References Cited

U.S. PATENT DOCUMENTS

| | | | |
|---|---|---|---|
| 7,779,089 B2 | 8/2010 | Hessmer et al. | |
| 8,176,018 B1* | 5/2012 | Bisson | G06F 17/30144 707/690 |
| 8,219,564 B1* | 7/2012 | Shao | G06F 17/30946 707/743 |
| 8,458,290 B2 | 6/2013 | Black et al. | |
| 8,849,759 B2* | 9/2014 | Bestler | G06F 17/30197 707/638 |
| 2004/0181543 A1 | 9/2004 | Wu et al. | |
| 2004/0255137 A1* | 12/2004 | Ying | H04L 63/0442 713/193 |
| 2006/0089912 A1 | 4/2006 | Spagna et al. | |
| 2007/0028291 A1 | 2/2007 | Brennan et al. | |
| 2007/0100701 A1 | 5/2007 | Boccon-Gibod et al. | |
| 2007/0156852 A1* | 7/2007 | Sundarrajan | G06F 17/30902 709/219 |
| 2007/0250560 A1* | 10/2007 | Wein | H04L 67/1008 709/201 |
| 2008/0195664 A1* | 8/2008 | Maharajh | G06F 17/30035 707/E17.009 |
| 2008/0208820 A1* | 8/2008 | Usey | G06F 17/30616 707/E17.014 |
| 2009/0043786 A1* | 2/2009 | Schmidt | G06F 17/30091 707/E17.044 |
| 2009/0171990 A1* | 7/2009 | Naef, III | G06Q 10/06 707/E17.002 |
| 2009/0254572 A1 | 10/2009 | Redlich et al. | |
| 2010/0169391 A1* | 7/2010 | Baptist | G06F 17/30194 707/827 |
| 2010/0250497 A1 | 9/2010 | Redlich et al. | |
| 2010/0332401 A1* | 12/2010 | Prahlad | G06F 17/3002 711/162 |
| 2011/0096828 A1* | 4/2011 | Chen | H04N 21/23106 375/240.02 |
| 2011/0137973 A1* | 6/2011 | Wei | H04L 67/1008 709/202 |
| 2011/0225417 A1* | 9/2011 | Maharajh | G06F 21/10 713/150 |
| 2011/0239078 A1* | 9/2011 | Luby | H04N 21/23106 714/752 |
| 2011/0296048 A1* | 12/2011 | Knox | H04L 65/605 709/231 |
| 2012/0036552 A1 | 2/2012 | Dare et al. | |
| 2012/0198022 A1 | 8/2012 | Black et al. | |
| 2012/0215684 A1* | 8/2012 | Kidron | G06F 17/30867 705/39 |
| 2012/0215816 A1 | 8/2012 | Kidron | |
| 2012/0233117 A1* | 9/2012 | Holt | H04L 67/06 707/620 |
| 2012/0233463 A1* | 9/2012 | Holt | G06F 17/30575 713/168 |
| 2012/0233668 A1 | 9/2012 | Leafe et al. | |
| 2012/0254982 A1* | 10/2012 | Sallam | G06F 21/566 726/16 |
| 2012/0310880 A1 | 12/2012 | Giampaolo et al. | |
| 2013/0018855 A1 | 1/2013 | Eshghi et al. | |
| 2013/0036277 A1* | 2/2013 | Szczepkowski | G06F 3/0608 711/159 |
| 2013/0054518 A1* | 2/2013 | Anglin | G06F 17/30575 707/610 |
| 2013/0107223 A1* | 5/2013 | Toyooka | G03B 21/16 353/31 |
| 2013/0159648 A1* | 6/2013 | Anglin | G06F 11/1453 711/162 |
| 2013/0166580 A1* | 6/2013 | Maharajh | H04L 65/605 707/758 |
| 2013/0238563 A1* | 9/2013 | Amarendran | G06F 17/30221 707/654 |
| 2013/0262627 A1* | 10/2013 | Black | H04L 67/1097 709/217 |
| 2013/0340028 A1 | 12/2013 | Rajagopal et al. | |
| 2014/0075501 A1* | 3/2014 | Srinivasan | G06F 21/62 726/1 |
| 2014/0108474 A1* | 4/2014 | David | G06F 17/30 707/827 |
| 2014/0149548 A1* | 5/2014 | Chhabra | H04N 21/2181 709/217 |
| 2014/0282900 A1* | 9/2014 | Wang | H04L 63/04 726/4 |
| 2015/0220561 A1* | 8/2015 | Goetz | G06F 17/30 707/827 |

OTHER PUBLICATIONS

Hweehway Pang, Arpit Jain Krithi Ramamritham; Kian-Lee Tan;—"Verifying completeness of relational query results in data publishing"—Proceeding SIGMOD '05 Proceedings of the 2005 ACM SIGMOD international conference on Management of data and Symposium on Principals Database and Systems, Baltimore, MD USA , pp. 1-12, Jun. 13-17, 2005.

* cited by examiner

SYSTEM AND METHOD FOR EXPOSING CLOUD STORED DATA TO A CONTENT DELIVERY NETWORK

The present application is a continuation of U.S. patent application Ser. No. 13/653,208, filed on Oct. 16, 2012, now U.S. Pat. No. 9,015,212 granted Apr. 21, 2015, the entirety of which is hereby incorporated by reference.

BACKGROUND

The present disclosure relates generally to cloud computing, and more particularly to an origin server for a content delivery network.

Cloud computing services can provide computational capacity, data access, networking/routing and storage services via a large pool of shared resources operated by a cloud computing provider. Because the computing resources are delivered over a network, cloud computing is location-independent computing, with all resources being provided to end-users on demand with control of the physical resources separated from control of the computing resources.

Originally the term cloud came from a diagram that contained a cloud-like shape to contain the services that afforded computing power that was harnessed to get work done. Much like the electrical power we receive each day, cloud computing is a model for enabling access to a shared collection of computing resources—networks for transfer, servers for storage, and applications or services for completing work. More specifically, the term "cloud computing" describes a consumption and delivery model for IT services based on the Internet, and it typically involves over-the-Internet provisioning of dynamically scalable and often virtualized resources. This frequently takes the form of web-based tools or applications that users can access and use through a web browser as if it was a program installed locally on their own computer. Details are abstracted from consumers, who no longer have need for expertise in, or control over, the technology infrastructure "in the cloud" that supports them. Most cloud computing infrastructures consist of services delivered through common centers and built on servers. Clouds often appear as single points of access for consumers' computing needs, and do not require end-user knowledge of the physical location and configuration of the system that delivers the services.

The utility model of cloud computing is useful because many of the computers in place in data centers today are underutilized in computing power and networking bandwidth. People may briefly need a large amount of computing capacity to complete a computation for example, but may not need the computing power once the computation is done. The cloud computing utility model provides computing resources on an on-demand basis with the flexibility to bring it up or down through automation or with little intervention.

As a result of the utility model of cloud computing, there are a number of aspects of cloud-based systems that can present challenges to existing application infrastructure. First, clouds should enable self-service, so that users can provision servers and networks with little human intervention. Second, network access; because computational resources are delivered over the network, the individual service endpoints need to be network-addressable over standard protocols and through standardized mechanisms. Third, multi-tenancy. Clouds are designed to serve multiple consumers according to demand, and it is important that resources be shared fairly and that individual users not suffer performance degradation. Fourth, elasticity. Clouds are designed for rapid creation and destruction of computing resources, typically based upon virtual containers. Provisioning these different types of resources must be rapid and scale up or down based on need. Further, the cloud itself as well as applications that use cloud computing resources must be prepared for impermanent, fungible resources; application or cloud state must be explicitly managed because there is no guaranteed permanence of the infrastructure. Fifth, clouds typically provide metered or measured service—like utilities that are paid for by the hour, clouds should optimize resource use and control it for the level of service or type of servers such as storage or processing.

Cloud computing offers different service models depending on the capabilities a consumer may require, including SaaS, PaaS, and IaaS-style clouds. SaaS (Software as a Service) clouds provide the users the ability to use software over the network and on a distributed basis. SaaS clouds typically do not expose any of the underlying cloud infrastructure to the user. PaaS (Platform as a Service) clouds provide users the ability to deploy applications through a programming language or tools supported by the cloud platform provider. Users interact with the cloud through standardized APIs, but the actual cloud mechanisms are abstracted away. Finally, IaaS (Infrastructure as a Service) clouds provide computer resources that mimic physical resources, such as computer instances, network connections, and storage devices. The actual scaling of the instances may be hidden from the developer, but users are required to control the scaling infrastructure.

One particular type of IaaS cloud service is cloud storage. A cloud storage application gives users access to large amounts of redundant, distributed data storage. The user does not need to be concerned with the actual details of how and where the data is stored, as these details will generally be left to the cloud services provider. In some applications, the user may specify policies instructing the cloud services provider on certain levels of redundancy and distribution (e.g., three copies of all data, each stored in separate data centers). However low level details regarding the organization of the data and utilization of the storage devices are generally left to the provider.

As with most data stored today, users often desire that data stored in cloud storage be accessible by other users over the Internet. One way to accomplish this is to run a web server in the cloud computing system and serve the data directly from the cloud storage in response to received requests. Although this approach may be practical for certain applications, it could prove to be inefficient in cases where requests for the data originate from many different geographic regions that may not be near the servers storing the data in the cloud storage system. Further, network problems between the requesting user and the cloud storage system storing the data may also cause performance issues.

Content delivery networks or "CDNs" solve these issues. A content delivery network is a distributed network of servers designed to mirror content and provide it to a requesting user in the most efficient manner possible, such as from the server geographically closest to the requesting user or from the server with the best performance route between itself and the requesting user. Content delivery networks are used for a large portion of today's Internet traffic, and are especially useful for high bandwidth applications such as streaming audio or video, and software distribution. Companies offering content delivery networks include Akamai, Limelight, Amazon, and Rackspace.

In a content delivery network, content is fed into the network from an origin server. The origin server stores the definitive copy of the data to be mirrored across the content delivery network, and is responsible for keeping the content delivery network abreast of changes to the data. Changes to the data can be pushed from the origin server to the content delivery network as they occur, or the content delivery network can periodically poll the origin server for updates. In other applications, data on the content delivery network is given a time-to-live or "TTL," after which the content delivery network must refresh the data from the origin server.

Accordingly, it is a desirable feature of a cloud storage system to allow data stored in the system to be replicated and served by a content delivery network. One approach to implementing such a system is to have a separate application (an origin server) storing the content delivery configuration information in a separate database and fetching information from the cloud storage system as requested by the content delivery network. While such a system is functional, it fails to take advantage of the inherent scalability and performance benefits available in a cloud computing system. Accordingly, what is necessary is a high performance, scalable origin server that is integrated into the cloud computing system.

DETAILED DESCRIPTION

The following disclosure has reference to computing services delivered on top of a cloud architecture.

Figure 1:
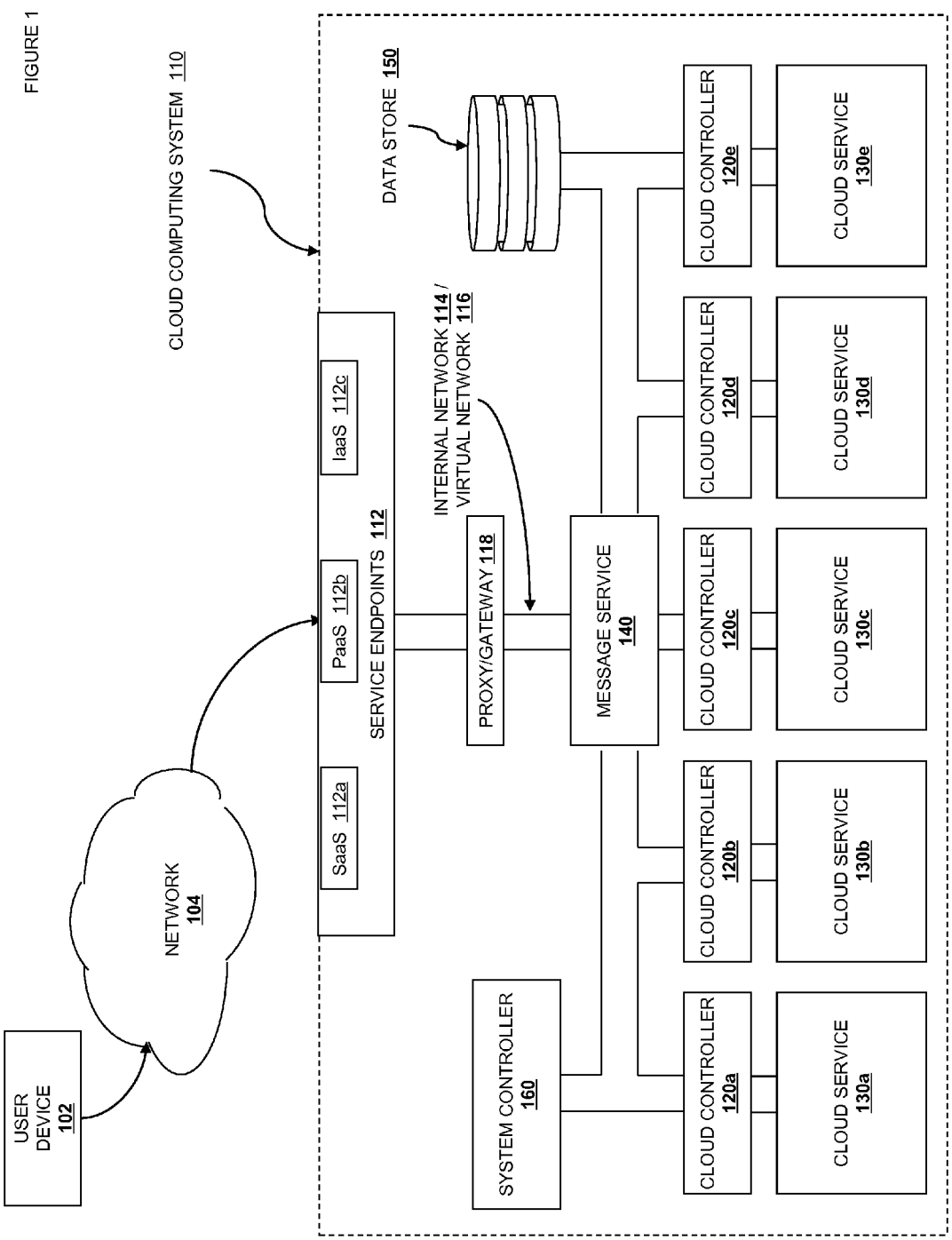
FIG. 1 is a schematic view illustrating an external view of a cloud computing system.

Referring now to FIG. 1, an external view of one embodiment of a cloud computing system 110 is illustrated. The object storage service 100 includes a user device 102 connected to a network 104 such as, for example, a Transport Control Protocol/Internet Protocol (TCP/IP) network (e.g., the Internet.) The user device 102 is coupled to the cloud computing system 110 via one or more service endpoints 112. Depending on the type of cloud service provided, these endpoints give varying amounts of control relative to the provisioning of resources within the cloud computing system 110. For example, SaaS endpoint 112a will typically only give information and access relative to the application running on the cloud storage system, and the scaling and processing aspects of the cloud computing system will be obscured from the user. PaaS endpoint 112b will typically give an abstract Application Programming Interface (API) that allows developers to declaratively request or command the backend storage, computation, and scaling resources provided by the cloud, without giving exact control to the user. IaaS endpoint 112c will typically provide the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 110 to be used for new, user-defined services without requiring specific support.

It is important to recognize that the control allowed via an IaaS endpoint is not complete. Within the cloud computing system 110 are one more cloud controllers 120 (running what is sometimes called a "cloud operating system") that work on an even lower level, interacting with physical machines, managing the contradictory demands of the multi-tenant cloud computing system 110. The workings of the cloud controllers 120 are typically not exposed outside of the cloud computing system 110, even in an IaaS context. In one embodiment, the commands received through one of the service endpoints 112 are then routed via one or more internal networks 114. The internal network 114 couples the different services to each other. The internal network 114 may encompass various protocols or services, including but not limited to electrical, optical, or wireless connections at the physical layer; Ethernet, Fibre channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 114 is typically not exposed outside the cloud computing system, except to the extent that one or more virtual networks 116 may be exposed that control the internal routing according to various rules. The virtual networks 116 typically do not expose as much complexity as may exist in the actual internal network 114; but varying levels of granularity can be exposed to the control of the user, particularly in IaaS services.

In one or more embodiments, it may be useful to include various processing or routing nodes in the network layers 114 and 116, such as proxy/gateway 118. Other types of processing or routing nodes may include switches, routers, switch fabrics, caches, format modifiers, or correlators.

These processing and routing nodes may or may not be visible to the outside. It is typical that one level of processing or routing nodes may be internal only, coupled to the internal network 114, whereas other types of network services may be defined by or accessible to users, and show up in one or more virtual networks 116. Either of the internal network 114 or the virtual networks 116 may be encrypted or authenticated according to the protocols and services described below.

In various embodiments, one or more parts of the cloud computing system 110 may be disposed on a single host. Accordingly, some of the "network" layers 114 and 116 may be composed of an internal call graph, inter-process communication (IPC), or a shared memory communication system.

Once a communication passes from the endpoints via a network layer 114 or 116, as well as possibly via one or more switches or processing devices 118, it is received by one or more applicable cloud controllers 120. The cloud controllers 120 are responsible for interpreting the message and coordinating the performance of the necessary corresponding services, returning a response if necessary. Although the cloud controllers 120 may provide services directly, more typically the cloud controllers 120 are in operative contact with the cloud services 130 necessary to provide the corresponding services. For example, it is possible for different services to be provided at different levels of abstraction. For example, a "compute" service 130a may work at an IaaS level, allowing the creation and control of user-defined virtual computing resources. In the same cloud computing system 110, a PaaS-level object storage service 130b may provide a declarative storage API, and a SaaS-level Queue service 130c, DNS service 130d, or Database service 130e may provide application services without exposing any of the underlying scaling or computational resources. Other services are contemplated as discussed in detail below.

In various embodiments, various cloud computing services or the cloud computing system itself may require a message passing system. The message routing service 140 is available to address this need, but it is not a required part of the system architecture in at least one embodiment. In one embodiment, the message routing service is used to transfer messages from one component to another without explicitly linking the state of the two components. Note that this message routing service 140 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 150 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it may be useful for the cloud computing system 110 to have a system controller 160. In one embodiment, the system controller 160 is similar to the cloud computing controllers 120, except that it is used to control or direct operations at the level of the cloud computing system 110 rather than at the level of an individual service.

For clarity of discussion above, only one user device 102 has been illustrated as connected to the cloud computing system 110, and the discussion generally referred to receiving a communication from outside the cloud computing system, routing it to a cloud controller 120, and coordinating processing of the message via a service 130, the infrastructure described is also equally available for sending out messages. These messages may be sent out as replies to previous communications, or they may be internally sourced. Routing messages from a particular service 130 to a user device 102 is accomplished in the same manner as receiving a message from user device 102 to a service 130, just in reverse. The precise manner of receiving, processing, responding, and sending messages is described below with reference to the various discussed service embodiments. One of skill in the art will recognize, however, that a plurality of user devices 102 may, and typically will, be connected to the cloud computing system 110 and that each element or set of elements within the cloud computing system is replicable as necessary. Further, the cloud computing system 110, whether or not it has one endpoint or multiple endpoints, is expected to encompass embodiments including public clouds, private clouds, hybrid clouds, and multi-vendor clouds.

Figure 2:
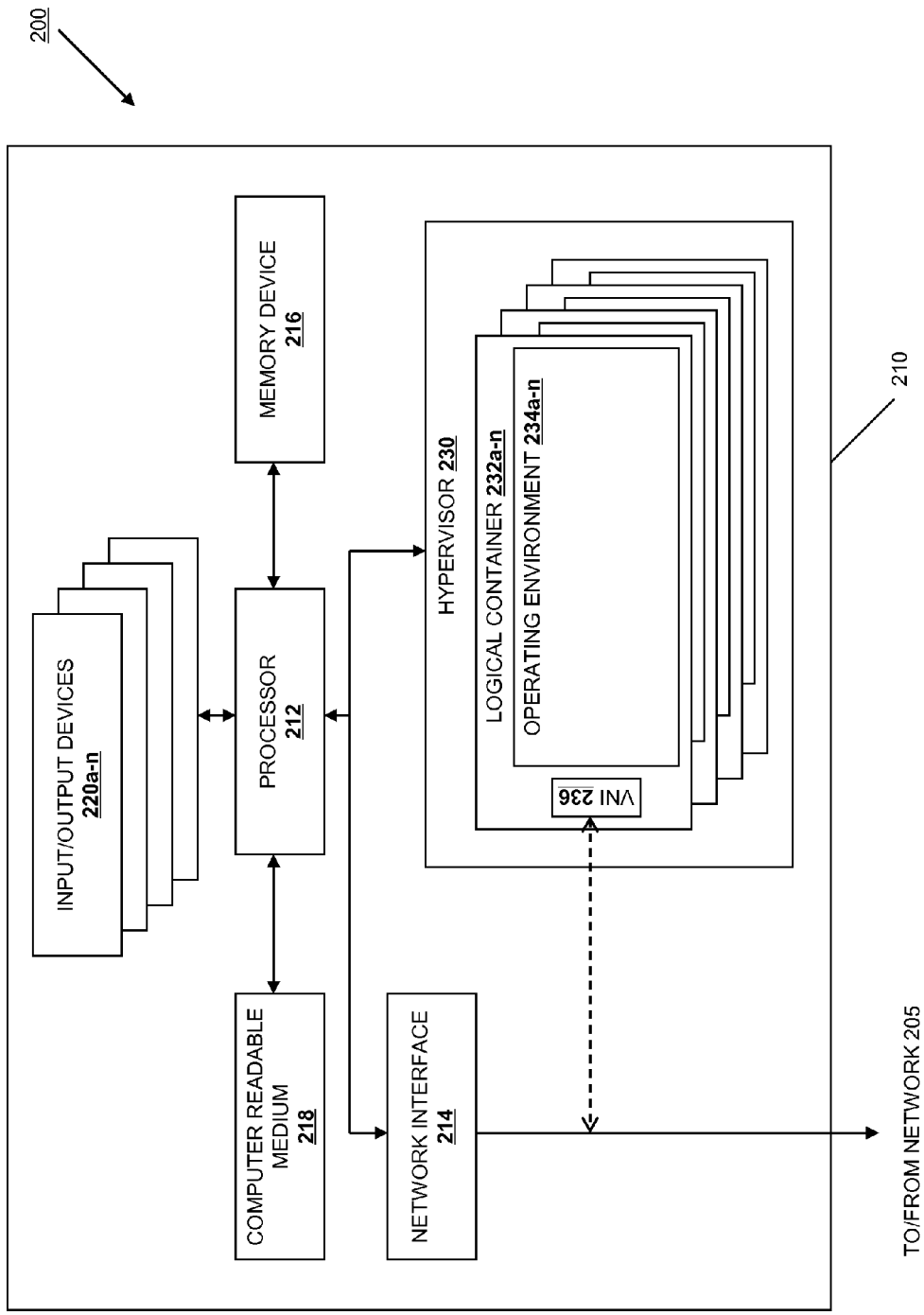
FIG. 2 is a schematic view illustrating an information processing system as used in various embodiments.

Each of the user device 102, the cloud computing system 110, the endpoints 112, the network switches and processing nodes 118, the cloud controllers 120 and the cloud services 130 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, diagram 200 shows an information processing system 210 configured to host one or more virtual machines, coupled to a network 205. The network 205 could be one or both of the networks 114 and 116 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220a-n which are operably coupled to the processor 212, for inputting or outputting information, such as a display device 220a, a print device 220b, or other electronic circuitry 220c-n for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xenserver, KVM, VMware, Microsoft's Hyper-V, and emulation programs such as QEMU.

The hypervisor 230 includes the functionality to add, remove, and modify a number of logical containers 232a-n associated with the hypervisor. Zero, one, or many of the logical containers 232a-n contain associated operating environments 234a-n. The logical containers 232a-n can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

Figure 3:
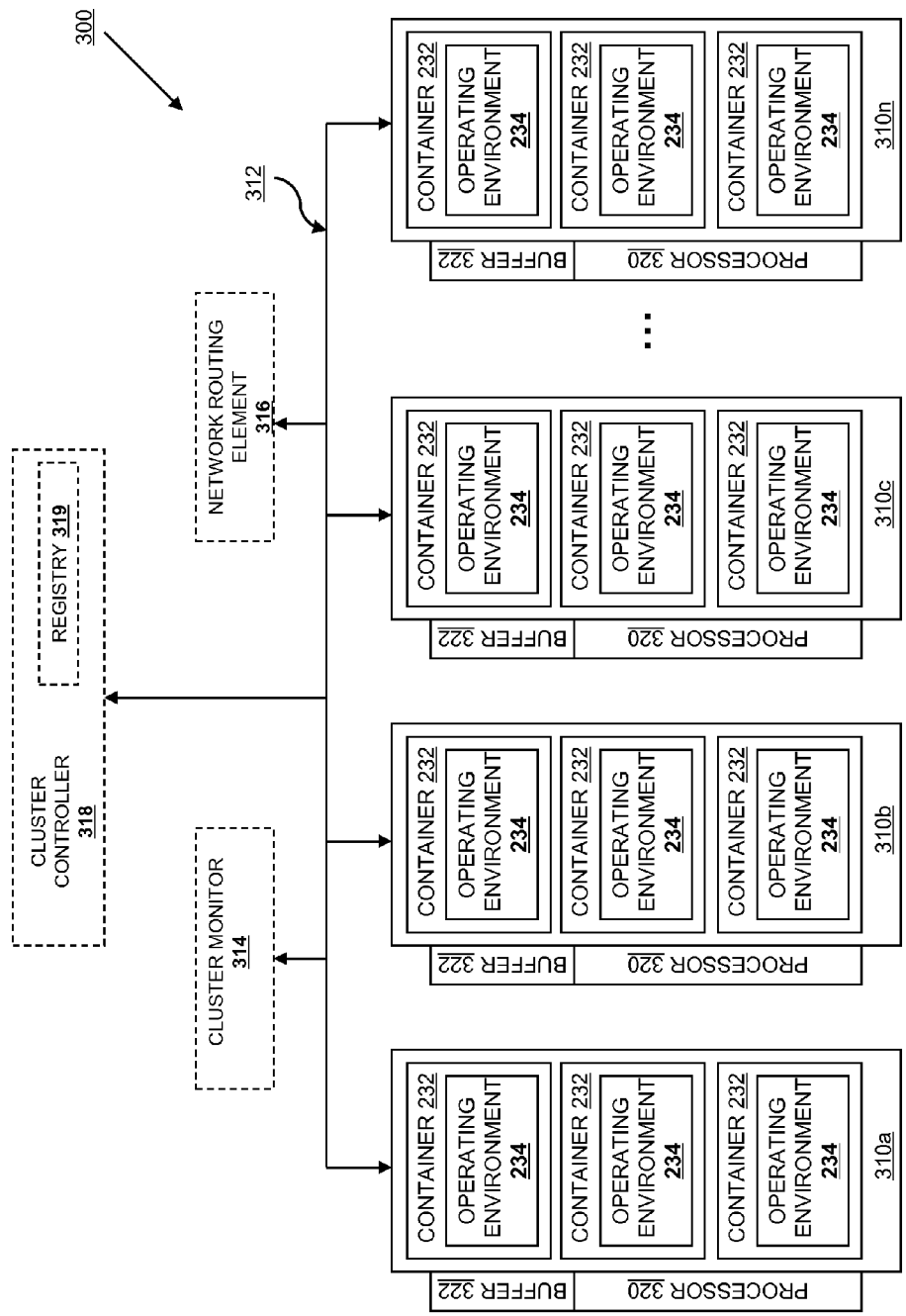
FIG. 3 is a virtual machine management system as used in various embodiments.

Turning now to FIG. 3, a simple network operating environment 300 for a cloud controller or cloud service is shown. The network operating environment 300 includes multiple information processing systems 310a-n, each of which correspond to a single information processing system 210 as described relative to FIG. 2, including a hypervisor 230, zero or more logical containers 232 and zero or more operating environments 234. The information processing systems 310a-n are connected via a communication medium 312, typically implemented using a known network protocol such as Ethernet, Fibre Channel, Infiniband, or IEEE 1394. For ease of explanation, the network operating environment 300 will be referred to as a "cluster," "group," or "zone" of operating environments. The cluster may also include a cluster monitor 314 and a network routing element 316. The cluster monitor 314 and network routing element 316 may be implemented as hardware, as software running on hardware, or may be implemented completely as software. In one implementation, one or both of the cluster monitor 314 or network routing element 316 is implemented in a logical container 232 using an operating environment 234 as described above. In another embodiment, one or both of the cluster monitor 314 or network routing element 316 is implemented so that the cluster corresponds to a group of physically co-located information processing systems, such as in a rack, row, or group of physical machines.

The cluster monitor 314 provides an interface to the cluster in general, and provides a single point of contact allowing someone outside the system to query and control any one of the information processing systems 310, the logical containers 232 and the operating environments 234. In one embodiment, the cluster monitor also provides monitoring and reporting capabilities.

The network routing element 316 allows the information processing systems 310, the logical containers 232 and the operating environments 234 to be connected together in a network topology. The illustrated tree topology is only one possible topology; the information processing systems and operating environments can be logically arrayed in a ring, in a star, in a graph, or in multiple logical arrangements through the use of vLANs.

In one embodiment, the cluster also includes a cluster controller 318. The cluster controller is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234.

The cluster controller 318 is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234. In one embodiment, the cluster controller 318 includes a registry of VM information 319. In a second embodiment, the registry 319 is associated with but not included in the cluster controller 318.

In one embodiment, the cluster also includes one or more instruction processors 320. In the embodiment shown, the instruction processor is located in the hypervisor, but it is also contemplated to locate an instruction processor within an active VM or at a cluster level, for example in a piece of machinery associated with a rack or cluster. In one embodiment, the instruction processor 320 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium. Further, one or more embodiments have associated with them a buffer 322. The buffer 322 can take the form of data structures, a memory, a computer-readable medium, or an off-script-processor facility. For example, one embodiment uses a language runtime as an instruction processor 320. The language runtime can be run directly on top of the hypervisor, as a process in an active operating environment, or can be run from a low-power embedded processor. In a second embodiment, the instruction processor 320 takes the form of a series of interoperating but discrete components, some or all of which may be implemented as software programs. For example, in this embodiment, an interoperating bash shell, gzip program, an rsync program, and a cryptographic accelerator chip are all components that may be used in an instruction processor 320. In another embodiment, the instruction processor 320 is a discrete component, using a small amount of flash and a low power processor, such as a low-power ARM processor. This hardware-based instruction processor can be embedded on a network interface card, built into the hardware of a rack, or provided as an add-on to the physical chips associated with an information processing system 310. It is expected that in many embodiments, the instruction processor 320 will have an integrated battery and will be able to spend an extended period of time without drawing current. Various embodiments also contemplate the use of an embedded Linux or Linux-Android environment.

In the disclosure that follows, the information processing devices as described relative to FIG. 2 and the clusters as described relative to FIG. 3 are used as underlying infrastructure to build and administer various cloud services. Except where noted specifically, either a single information processing device or a cluster can be used interchangeably to implement a single "node," "service," or "controller." Where a plurality of resources are described, such as a plurality of storage nodes or a plurality of compute nodes, the plurality of resources can be implemented as a plurality of information processing devices, as a one-to-one relationship of information processing devices, logical containers, and operating environments, or in an M×N relationship of information processing devices to logical containers and operating environments.

Various aspects of the services implemented in the cloud computing system may be referred to as "virtual machines" or "virtual devices"; as described above, those refer to a particular logical container and operating environment, configured to perform the service described. The term "instance" is sometimes used to refer to a particular virtual machine running inside the cloud computing system. An "instance type" describes the compute, memory and storage capacity of particular VM instances.

In various embodiments, groups of resources (information processing systems, logical containers, operating environments, users, accounts, etc.) may be organized into "zones." A zone is defined as a group of one or more resources that share one or more common characteristics and are grouped together to achieve some function. For example, one example of a zone is an availability zone, which is a group of resources subject to a correlated loss of access or data as a result of a particular event. For example, a group of operating environments that use a common underlying network connection, power connection, or computer-readable medium is subject to loss of access to its stored objects as a result of a failure of one of these resources. A group of resources in the same cluster may suffer a loss of access if the cluster is contained within a single physical building.

Zones may overlap and may be defined for different reasons. For example, a group of resources that share a computer-readable medium may be defined to be in one zone. A plurality of information processing devices 210 (and their underlying hypervisors 230, logical containers 232 and operating environments 234) in a given storage rack or cabinet may be defined to be in a zone. A plurality of information processing devices 210 (and their underlying hypervisors 230, logical containers 232 and operating environments 234) coupled to the same networking switch may be defined to be in a zone; and a plurality of information processing devices 210 (and their underlying hypervisors 230, logical containers 232 and operating environments 234), in a given datacenter may be defined to be in a zone.

In another embodiment, a zone is defined by the availability of specialized hardware or by hardware of a certain class. For example, a plurality of information processing devices 210 (and their underlying hypervisors 230, logical containers 232 and operating environments 234) that have access to high-throughput and low-latency storage, like a solid state disk, may be defined to be in a zone. Zones may be organized to reflect differing amounts of memory, processor speeds, age of installation, type of operating system or hypervisor, or any other underlying difference in platforms.

One of skill in the art will recognize that the examples of zones provided above are not limiting, and a variety of possible organizational schemes fall into the scope of the present disclosure.

Within the architecture described above, various services are provided, and different capabilities can be included through a plug-in architecture. Although specific services and plugins are detailed below, these disclosures are intended to be representative of the services and plugins available for integration across the entire cloud computing system 110.

Security and Access Control

Figure 4:
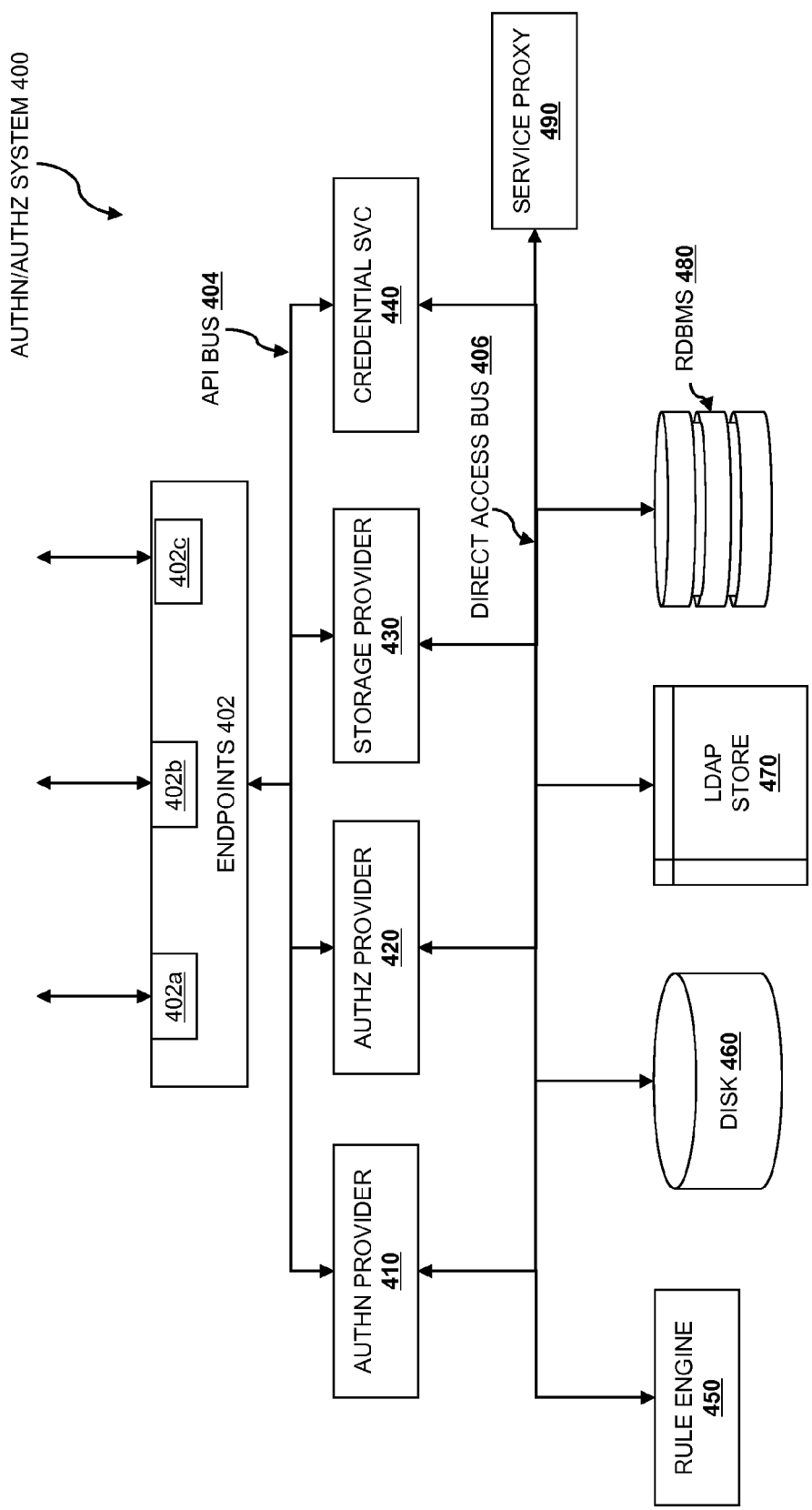
FIG. 4 is a PaaS-style identity and authentication service according to various embodiments.

One common need for cloud computing systems is an authentication and authorization system. Turning now to FIG. 4, one exemplary authentication ("authn") and authorization ("authz") system is shown at 400. The authn/authz system shown at 400 is exemplary only and can be used in several different aspects within a cloud computing system. For example, one embodiment uses a single authn/authz system for the entire cloud computing "platform," including all subsidiary services. Another embodiment has separate authn/authz services for each subsidiary service. A third embodiment has a split authn/authz service, with authn being handled globally so that user, project, tenant, and account details are consistent, but allowing authz to be handled within each subsidiary service so that the privileges granted are logically and physically separable. A further embodiment has multiple authn/authz services, where there are one or more authn/authz services 600 that are used to mediate the authentication and authorization of users to interact with the cloud computing platform and its subsidiary components, and one or more authn/authz services 400 that are tenant-specific and used to control and expose internal virtual cloud resources in a controlled fashion. Rule-based access controls govern the use and interactions of these logical entities.

In a preferred embodiment, a role-based computing system is a system in which identities and resources are managed by aggregating them into "roles" based on job functions, physical location, legal controls, and other criteria. These roles can be used to model organizational structures, manage assets, or organize data. By arranging roles and the associated rules into graphs or hierarchies, these roles can be used to reason about and manage various resources.

In one application, role-based strategies have been used to form a security model called Role-Based Access Control (RBAC). RBAC associates special rules, called "permissions," with roles; each role is granted only the minimum permissions necessary for the performance of the functions associated with that role. Identities are assigned to roles, giving the users and other entities the permissions necessary to accomplish job functions. RBAC has been formalized mathematically by NIST and accepted as a standard by ANSI. American National Standard 359-2004 is the information technology industry consensus standard for RBAC, and is incorporated herein by reference in its entirety.

In a preferred embodiment, a user is defined as an entity that will act in one or more roles. A user is typically associated with an internal or external entity that will interact with the cloud computing system in some respect. A user can have multiple roles simultaneously. In one embodiment of the system, a user's roles define which API commands that user can perform.

Although the "user" construct may sometimes represent a physical human being, there is no limitation that a user must be a person. Rather, a user may be a person, system, or service who interacts with the cloud computing system and is associable with a distinct identity. The authn/authz service 400 validates requests and API calls with reference to the declared user. No particular implementation of the user construct is required; users may be locally unique within a defined realm or globally unique within the cloud computing system. In most embodiments, a user will be identified using one or more "IDs." These user IDs can be numbers, strings of characters, or compound multi-valued objects. In some embodiments, this user ID is (or is associated with) a "login"—a sequence of characters presented to the authn/ authz system 400 to identify the user. In some embodiments, users can also have further non-security-related metadata associated with them, such as names, companies, email addresses, locations, etc.

In a preferred embodiment, a resource is defined as some object to which access is restricted. In various embodiments, resources can include network or user access to a virtual machine or virtual device, the ability to use the computational abilities of a device, access to storage, an amount of storage, API access, ability to configure a network, ability to access a network, network bandwidth, network speed, network latency, ability to access or set authentication rules, ability to access or set rules regarding resources, etc. In general, any item which may be restricted or metered is modeled as a resource.

In one embodiment, resources may have quotas associated with them. A quota is a rule limiting the use or access to a resource. A quota can be placed on a per-project level, a per-role level, a per-user level, or a per-group level. In one embodiment, quotas can be applied to the number of volumes which can be created, the total size of all volumes within a project or group, the number of instances which can be launched, both total and per instance type, the number of processor cores which can be allocated, and publicly accessible IP addresses. Other restrictions are also contemplated as described herein.

In a preferred embodiment, a project is defined as a flexible association of users, acting in certain roles, which will define and access various resources. A project is typically defined by an administrative user according to varying demands. There may be templates for certain types of projects, but a project is a logical grouping created for administrative purposes and may or may not bear a necessary relation to anything outside the project. In a preferred embodiment, arbitrary roles can be defined relating to one or more particular projects only.

In a preferred embodiment, a group is defined as a logical association of some other defined entity. There may be groups of users, groups of resources, groups of projects, groups of quotas, or groups which contain multiple different types of defined entities. For example, in one embodiment, a group "development" is defined. The development group may include a group of users with the tag "developers" and a group of virtual machine resources ("developer machines"). These may be connected to a developer-only virtual network ("devnet"). The development group may have a number of ongoing development projects, each with an associated "manager" role. There may be per-user quotas on storage and a group-wide quota on the total monthly bill associated with all development resources.

The applicable set of rules, roles, and quotas is based upon context. In one embodiment, there are global roles, user-specific roles, project-specific roles, and group-specific roles. In one embodiment, a user's actual permissions in a particular project are the intersection of the global roles, user-specific roles, project-specific roles, and group-specific roles associated with that user, as well as any rules associated with project or group resources possibly affected by the user. Other embodiments may also use other grouping or organizational identifiers, such as domains, realms, locations, and organizations.

In a preferred embodiment, a credential is an identifying token. This token can be either something that is uniquely known or controlled by the user, such as a password, key, certificate, token, or other piece of information, or it can be something associated with the user's identity, such as voice prints, iris or retinal scan data, fingerprints, etc. In one embodiment, unique machine-identifying data can also be used as a credential, such as IP addresses, MAC addresses, embedded key, computer chip, or serial number information, or computationally secure data processing circuits. In one embodiment, the identity-based credential is unique to the user being identified. In a second embodiment, credentials are treated probabilistically, and a number of credentials can be combined to increase the confidence that the user has been authenticated correctly.

In a preferred embodiment, authentication is the act of confirming the identity of a user or the truth of a claim. The authn/authz service 400 confirms that incoming requests are being made by the user who claims to be making the call by validating a set of claims provided by the user. In one embodiment, the claims are initially in the form of a set of credentials (username & password, or login and API key). After initial confirmation. The authn/authz service 400 issues a token that can serve as a credential.

In a preferred embodiment, authorization is the act of confirming the capability of a user to perform some action. The authn/authz service 400 confirms that the user is authorized to perform the actions corresponding to the user's incoming requests. An individual authorization is called a "permission." In one embodiment, if a user is not authenticated, a "default" or "anonymous" profile is used as the default identity. A token can contain or refer to a set of authorization permissions.

In a preferred embodiment, a token is a data (such as a string) that corresponds to an identity. Tokens are generally cryptographically generated to prevent forging and are associated with access controls. Each token has a scope and a timeframe that describe the resources that can be accessed using the token.

In a preferred embodiment, an endpoint is a network-accessible address, usually described by URL or URI, where a service may be accessed.

These different pieces can be used to collectively authenticate and authorize a user. Although the authn/authz service will be described in terms of specific embodiments below, the logical constructs are more important than the particular implementations, and the representation of any particular part of the system may change from embodiment to embodiment.

Turning again to FIG. 4, the authn/authz service 400 is organized as a group of internal services exposed on one or many endpoints 402. Many of these services are used in a combined fashion by the frontend APIs (such as the service endpoints 112 described relative to FIG. 1). In one embodiment, the authz/authn service 400 immediately authenticates and authorizes a request arriving to the cloud computing system and creates and return a token credential that can be used internally to authorize and authenticate the services without having to duplicate the original credential checks. This token may be returned to the user or may be a hidden internal implementation detail for operational efficiency within the cloud computing system as a whole. In another embodiment, the authn/authz service 400 has a service-specific endpoint within each subsidiary service of the cloud computing system, such as endpoints 402a, 402b, and 402c. These endpoints can be exposed over HTTP, OAUTH, XAUTH, XML-RPC, SOAP, CORBA, LDAP, COM, Kerberos, RADIUS, OpenID, SAML, or other protocols known in the art.

The authn/authz service 400 has four primary divisions, the authn provider 410, the authz provider 420, the storage provider 430, and the credential service 440. The authn provider 410 performs the calculations or comparisons needed to authenticate a user given the provided credentials. The authz provider 420 performs the necessary analysis to determine whether an identified user has the necessary permissions to perform a requested action. The storage provider 430 provides access to a durable storage that contains authentication and authorization rules, tokens, credentials, and other necessary data. The credential service 440 provides new credentials on demand.

Each of these four divisions presents a unified API for consumers, regardless of the underlying implementation. In one or more embodiments, there are various backend services that actually implement, store, or calculate the data needed to provide the authentication, authorization, user/credential storage and generation services exposed by the providers 410, 420, 430, and 440. These backend services may include but are not limited to a rule engine 450, a disk store 460, an LDAP database 470, or an RDBMS 480. Although the embodiment shown in FIG. 4 shows only one backend provider of each type and an architecture in which all backend providers are commonly accessible, this is for purposes of illustration only and should not be considered a limitation.

For example, a first embodiment of the rule engine 450 encompasses multiple rule engines working in parallel or a single rule engine 450. The rule engine 450 may or may not have access to one or more disks 460, LDAP stores 470, RDBMS's 480. In another embodiment, some of the backend services may be combined. Looking again at the rule engine 450, one embodiment uses database logic, triggers, and stored procedures to implement the rule engine 450. Another implementation uses an RBAC analysis engine associated with an LDAP datastore like Active Directory or OpenLDAP. A third embodiment of the rule engine 450 is implemented as described elsewhere in this document. Other embodiments may use other implementations as known in the art.

In one embodiment, the disk store 460 is implemented using structured files on a computer-readable medium. For example, one embodiment of a disk store 460 comprises /etc/passwd and /etc/grp files. A second embodiment of a disk store 460 is a structured data store, such as a CSV, XML, SQLite or BerkelyDB-formatted and structured file on a disk. A third embodiment uses an object storage service. Other embodiments may use other implementations as known in the art.

In one embodiment, the LDAP store 470 is implemented using commercially available tree-structured directory such as Active Directory, OpenLDAP, the Red Hat directory service or Novell eDirectory. In another embodiment, the LDAP store 470 is implemented using a graph database or a key-value database, a document database, or a tree-structured filesystem with disk-based storage and attributes. Other embodiments may use other implementations as known in the art.

In one embodiment, the RDBMS 480 is implemented using commercially available relational database such as MySQL, PostgreSQL, Oracle database server, Microsoft SQL Server, SQLite, DB2, or other relational databases as known in the art.

Each of the four main divisions of the authn/authz service 400 can call out to other portions of the service, either using the API bus 404 or the direct access bus 406. The API bus 704 is a communications medium, such as a message service or network connection, that allows one provider to call another provider's API as part of its functionality. For example, in one embodiment the credential service 440 uses the API bus 704 to retrieve a representation of the permissions associated with a particular user so that the permissions can be encoded into a generated token.

The direct access bus 406 is a communications medium, such as a message service or network connection, which allows one provider to call out to one or more of the backend services to provide part or all of its functionality. For example, in one embodiment the authz provider 420 uses organizational information stored in the LDAP store 470 to evaluate whether a particular action is authorized.

The final component shown in FIG. 4 is the service proxy 490. The service proxy 490, either as a singular proxy or via multiple service proxies 490, transparently connect a remote implementation of one or more of the providers (410, 420, 430, 440) or services (450, 460, 470, 480) for execution in a remote location. In various embodiments the service proxy supports federation, caching, and user-specific business logic in the authn/authz system 400.

In one embodiment, two services capable of providing authn/authz service exist, authn/authz system 1 and authn/authz system 2. Each system has a set of local backend services providing authn, authz, storage, and credential access via the endpoints 402 for a set of users, where the two sets of users are disjoint. Further, a secure communication channel exists between the service proxy 490 of each service and the remote service. In one implementation, "fallback" logic is provided for each of the authn provider 410, authz provider 420, and storage provider 430. The fallback logic first looks to the local implementation for authentication and authorization of users and permissions. If the lookup fails, either in authentication or in authorization, or if the information necessary for calculation of authentication or authorization is not available to the local storage provider 430, then the service proxy 490 is used to present the same user request to the remote system. Only if both the local and remote calculation of authentication, authorization, or storage fails is a rejection returned.

Those of skill in the art will recognize several implications, extensions or modifications of the embodiment described above. First, it is preferred for the connection from the service proxy to go to an endpoint 402 or API bus 704 of a remote system so as to reduce the coupling between systems, but it is equally possible to use the service proxy to connect directly to a remote service implementation. Second, the remote service implementation does not need to be controlled by the cloud service provider, and in fact it may be more common to have a secure connection to a customer-internal authentication and authorization service so that sensitive authentication and authorization information can stay inside user-controlled systems and never be transmitted outside of a protected area. Third, the embodiment described above is bidirectional, but it would be equally easy to have a unidirectional federation by only connecting one service proxy 490 to the remote system without having the second reciprocal link. Fourth, the credential service 440 can also be proxied using the service proxy 490, but it may be more efficient in some circumstances to generate a new temporary credential at the local system so that the cross-service proxied call does not need to be made for subsequent accesses.

In a second embodiment, the service proxy 490 is used to support caching of remote information. This is related to the federation embodiment described above, except that a copy of the credentials and necessary information needed to identify the correct authentication and authorization responses can be saved in a local data store for use in subsequent connections. A "TTL" (time-to-live) value can be imposed on the cached values so as to force periodic reauthorization, and the connection between the service proxy 490 and the remote system can be used to revoke particular tokens or credentials for reasons other than the expiration of time. An advantage of particular embodiments is that the response to certain API calls can be cached without revealing the underlying mechanism used to compute the response.

In a third embodiment, the service proxy 490 is used to implement user-specific business logic via a plugin system. The service proxy 490 can be used to replace or proxy any provider or backend service to an arbitrary point, including a local service implementing user-specific logic. The service proxy 490 provides a plugin API or RPC API that allows user-defined authentication, authorization, storage, and credential services to be used transparently without any change in the outer API endpoints 402. In one implementation, this is performed similarly to the federation or caching examples above, but the "remote" service is actually provided at a local node running the user-provided plugin.

Other implementations of each of the services are also anticipated. In the same fashion described above, each provider or service is configurable to use a backend so that the authn/authz service 400 can fit a variety of environments and needs. In one embodiment, the backend for each service is defined in a configuration file and the proper backend is loaded at runtime.

Although graph-based, document-based, RDF-based, and key-value-based databases are not explicitly shown, their use is explicitly contemplated in the context of various embodiments. In one embodiment, a key-value store backend is implemented that can support primary key lookups, the most trivial implementation being an in-memory dictionary lookup. In a second embodiment, a relational database mapper can be used to provide many services on top of a traditional SQL backend, outside of simple RDBMS service. In a third embodiment, PAM (Pluggable Authentication Modules) are used as a backend via a system's PAM service. This provides a one-to-one relationship between Users and Groups with the root User also having the 'admin' role.

In one preferred embodiment, authentication of a user is performed through public/private encryption, with keys used to authenticate particular users, or in some cases, particular resources such as particular machines. A user or machine may have multiple keypairs associated with different roles, projects, groups, or permissions. For example, a different key may be needed for general authentication and for project access. In one such embodiment, a user is identified within the system by the possession and use of one or more cryptographic keys, such as an access and secret key. A user's access key needs to be included in a request, and the request must be signed with the secret key. Upon receipt of API requests, the rules engine verifies the signature and executes commands on behalf of the user.

Some resources, such as virtual machine images, can be shared by many users. Accordingly, it can be impractical or insecure to include private cryptographic information in association with a shared resource. In one embodiment, the system supports providing public keys to resources dynamically. In one exemplary embodiment, a public key, such as an SSH key, is injected into a VM instance before it is booted. This allows a user to login to the instances securely, without sharing private key information and compromising security. Other shared resources that require per-instance authentication are handled similarly.

In one embodiment, a rule processor is also used to attach and evaluate rule-based restrictions on non-user entities within the system. In this embodiment, a "Cloud Security Group" (or just "security group") is a named collection of access rules that apply to one or more non-user entities. Typically these will include network access rules, such as firewall policies, applicable to a resource, but the rules may apply to any resource, project, or group. For example, in one embodiment a security group specifies which incoming network traffic should be delivered to all VM instances in the group, all other incoming traffic being discarded. Users with the appropriate permissions (as defined by their roles) can modify rules for a group. New rules are automatically enforced for all running instances and instances launched from then on.

When launching VM instances, a project or group administrator specifies which security groups it wants the VM to join. If the directive to join the groups has been given by an administrator with sufficient permissions, newly launched VMs will become a member of the specified security groups when they are launched. In one embodiment, an instance is assigned to a "default" group if no groups are specified. In a further embodiment, the default group allows all network traffic from other members of this group and discards traffic from other IP addresses and groups. The rules associated with the default group can be modified by users with roles having the appropriate permissions.

In some embodiments, a security group is similar to a role for a non-user, extending RBAC to projects, groups, and resources. For example, one rule in a security group can stipulate that servers with the "webapp" role must be able to connect to servers with the "database" role on port 3306. In some embodiments, an instance can be launched with membership of multiple security groups—similar to a server with multiple roles. Security groups are not necessarily limited, and can be equally expressive as any other type of RBAC security. In one preferred embodiment, all rules in security groups are ACCEPT rules, making them easily composable.

In one embodiment, each rule in a security group must specify the source of packets to be allowed. This can be specified using CIDR notation (such as 10.22.0.0/16, representing a private subnet in the 10.22 IP space, or 0.0.0.0/0 representing the entire Internet) or another security group. The creation of rules with other security groups specified as sources helps deal with the elastic nature of cloud computing; instances are impermanent and IP addresses frequently change. In this embodiment, security groups can be maintained dynamically without having to adjust actual IP addresses.

In one embodiment, the APIs, RBAC-based authentication system, and various specific roles are used to provide a US eAuthentication-compatible federated authentication system to achieve access controls and limits based on traditional operational roles. In a further embodiment, the implementation of auditing APIs provides the necessary environment to receive a certification under FIPS 199 Moderate classification for a hybrid cloud environment.

Typical implementations of US eAuth authentication systems are structured as a Federated LDAP user store, backending to a SAML Policy Controller. The SAML Policy Controller maps access requests or access paths, such as requests to particular URLs, to a Policy Agent in front of an eAuth-secured application. In a preferred embodiment, the application-specific account information is stored either in extended schema on the LDAP server itself, via the use of a translucent LDAP proxy, or in an independent datastore keyed off of the UID provided via SAML assertion.

As described above, in one embodiment API calls are secured via access and secret keys, which are used to sign API calls, along with traditional timestamps to prevent replay attacks. The APIs can be logically grouped into sets that align with the following typical roles:
  Base User
  System Administrator
  Developer
  Network Administrator
  Project Administrator
  Group Administrator
  Cloud Administrator
  Security
  End-user/Third-party User In one currently preferred embodiment, System Administrators and Developers have the same permissions, Project and Group Administrators have the same permissions, and Cloud Administrators and Security have the same permissions. The End-user or Third-party User is optional and external, and may not have access to protected resources, including APIs. Additional granularity of permissions is possible by separating these roles. In various other embodiments, the RBAC security system described above is extended with SAML Token passing. The SAML token is added to the API calls, and the SAML UID is added to the instance metadata, providing end-to-end auditability of ownership and responsibility.

In an embodiment using the roles above, APIs can be grouped according to role. Any authenticated user may:
  Describe Instances
  Describe Images
  Describe Volumes
  Describe Keypairs
  Create Keypair
  Delete Keypair
  Create, Upload, Delete Buckets and Keys
System Administrators, Developers, Project Administrators, and Group Administrators may:
  Create, Attach, Delete Volume (Block Store)
  Launch, Reboot, Terminate Instance
  Register/Unregister Machine Image (project-wide)
  Request or Review Audit Scans
Project or Group Administrators may:
  Add and remove other users
  Set roles
  Manage groups
Network Administrators may:
  Change Machine Image properties (public/private)
  Change Firewall Rules
  Define Cloud Security Groups
  Allocate, Associate, Deassociate Public IP addresses
In this embodiment, Cloud Administrators and Security personnel would have all permissions. In particular, access to the audit subsystem would be restricted. Audit queries may spawn long-running processes, consuming resources. Further, detailed system information is a system vulnerability, so proper restriction of audit resources and results would be restricted by role.

In an embodiment as described above, APIs are extended with three additional type declarations, mapping to the "Confidentiality, Integrity, Availability" ("C.I.A.") classifications of FIPS 199. These additional parameters would also apply to creation of block storage volumes and creation of object storage "buckets." C.I.A. classifications on a bucket would be inherited by the keys within the bucket. Establishing declarative semantics for individual API calls allows the cloud environment to seamlessly proxy API calls to external, third-party vendors when the requested C.I.A. levels match.

In one embodiment, the interconnect is a bridged VPN connection. In one embodiment, there is a VPN server at each side of the interconnect with a unique shared certificate. A security group is created specifying the access at each end of the bridged connection. In a second embodiment, the interconnect VPN implements audit controls so that the connections between each side of the bridged connection can be queried and controlled. Network discovery protocols (ARP, CDP) can be used to provide information directly, and existing protocols (SNMP location data, DNS LOC records) overloaded to provide audit information.

Object Storage Service

Figure 5:
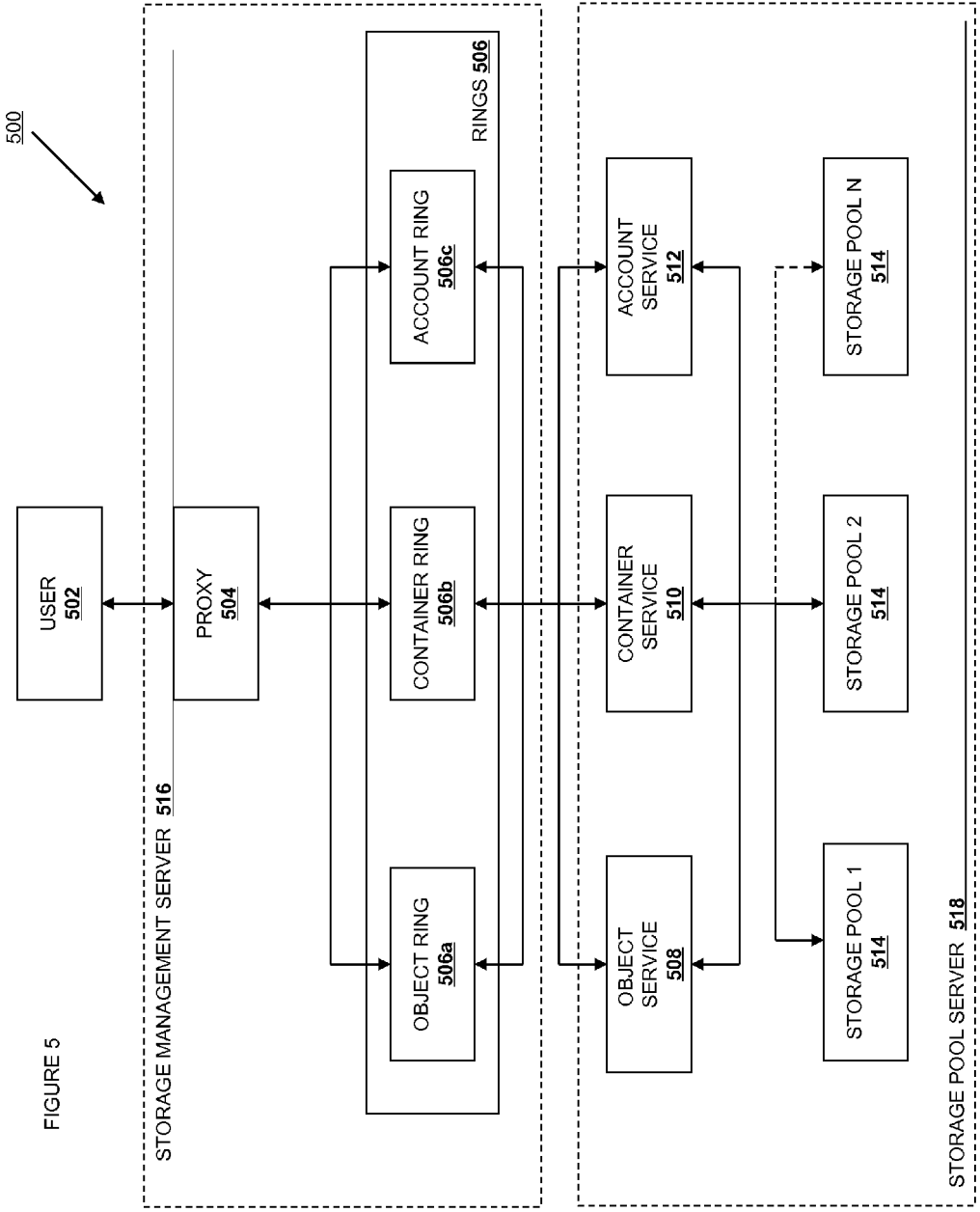
FIG. 5 is a PaaS-style object storage service according to various embodiments.

Referring now to FIG. 5, a diagram showing the logical structure of an object storage service is shown at reference 500. The structure connects a user 502 through a proxy 504, where the proxy 504 provides an API endpoint for interacting with the storage service 500. The proxy 504 is connected to one or more rings 506 such as an object ring 506a, a container ring 506b, and an account ring 506c, described in further detail below, that are connected to an object service 508, container service 510, and an account service 512, respectively, described in further detail below. In other embodiments, there are other types of objects managed by rings, such as a structured data ring, a graph storage ring, or another type of ring (not pictured). In such embodiments, each ring would be connected to an appropriate service, such as a structured data service, a graph service, or another service (not pictured).

In one embodiment, these rings and services are implemented as services integrated with or running on top of an information processing system 210 as described relative to FIG. 2. These could be running alone, or configured to host one or more virtual machines; the services and rings can be implemented on "bare metal," or within one or more of the virtual machines (logical containers and operating environments). The services and functionalities described relative to the object storage service may be centralized onto a smaller number of physical devices or may be expanded out to a large number of independent physical machines, including machines in different zones. For ease of explanation, two groupings are shown, wherein a storage management server 516 centralizes the proxy 504 and the rings 506, and a storage pool server 518 centralizes the object service 508, the container service, 510, the account service 512, and the storage pools 514. This grouping is for convenience in explanation only, however, and is not intended to be limiting. Further, each of these groupings may be logically present in a particular embodiment but may be implemented using a plurality of physical devices in a configuration that is different from the logical configuration presented.

In one embodiment, each storage pool 514 is provided by a separate storage server 518 or includes a virtual server that is included in a portion of one of the storage servers 518 or across a plurality of the storage servers 518. For example, the storage servers 518 may be physically located in one or more data centers, and the resources of the storage servers 518 may be virtualized according to the requirements of a plurality of users (e.g., the user 502) such that the plurality of storage pools 514 are provided to the plurality of users in order to store files and/or data objects. Thus, resources for a particular virtual server or storage pool may span across multiple storage servers 518.

Figure 6:
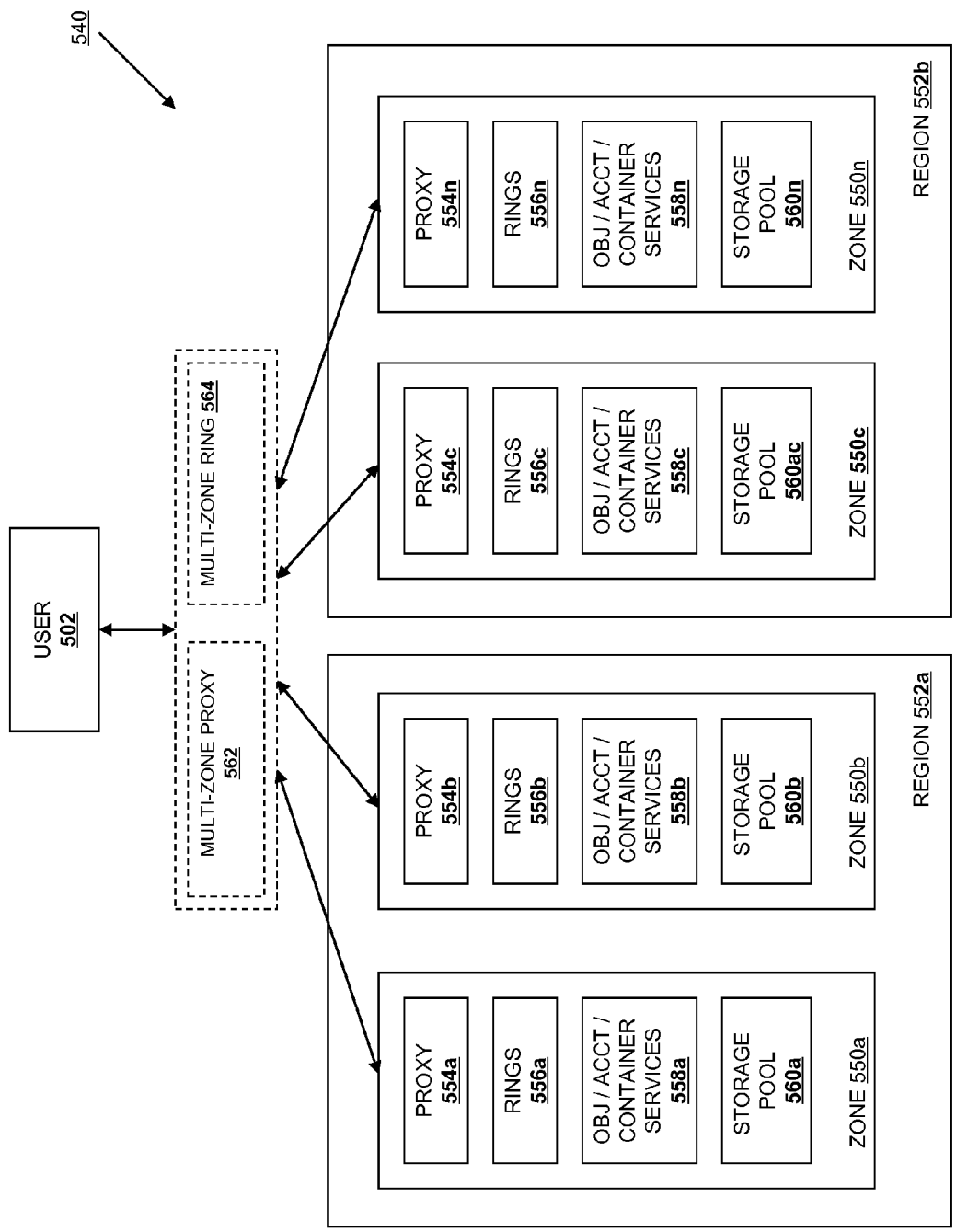
FIG. 6 is a schematic view illustrating an embodiment of a logical structure provided by the object storage service according to various embodiments.

Referring now to FIG. 6, a multi-zone object storage service is shown at reference 540. The multi-zone object storage service 540 encompasses multiple zones 550a-550n. These zones may be included in separate regions, such as the exemplary regions 552a and 552b. Each zone may also be under the control of a separate organization. Each zone includes a object storage service, such as the object storage service described relative to FIG. 5, possibly including in each object storage service a proxy 554a-n, one or more rings 556a-n, object, container, account, or other services 558a-n, and a storage pool 560a-n. In one embodiment, the user 502 interacts with each zone independently, addressing any requests directly to the proxies 554a-n. In a second embodiment of the multi-zone object storage service 540, there is an additional multi-zone proxy 562 or multi-zone ring 564. The multi-zone proxy 562 is used to provide a single entry point to the zones 550a-n, and the multi-zone ring 564 is used to balance requests across the zones 550a-n. An embodiment may use either a multi-zone proxy 562, or a multi-zone ring 564, or both, or neither. In an embodiment in which a multi-zone proxy 562 or a multi-zone ring 564 is used, the individual zones 550a-n can optionally forego the use of the zone-specific proxy 554a-n or zone-specific ring 556a-n.

Figure 7:
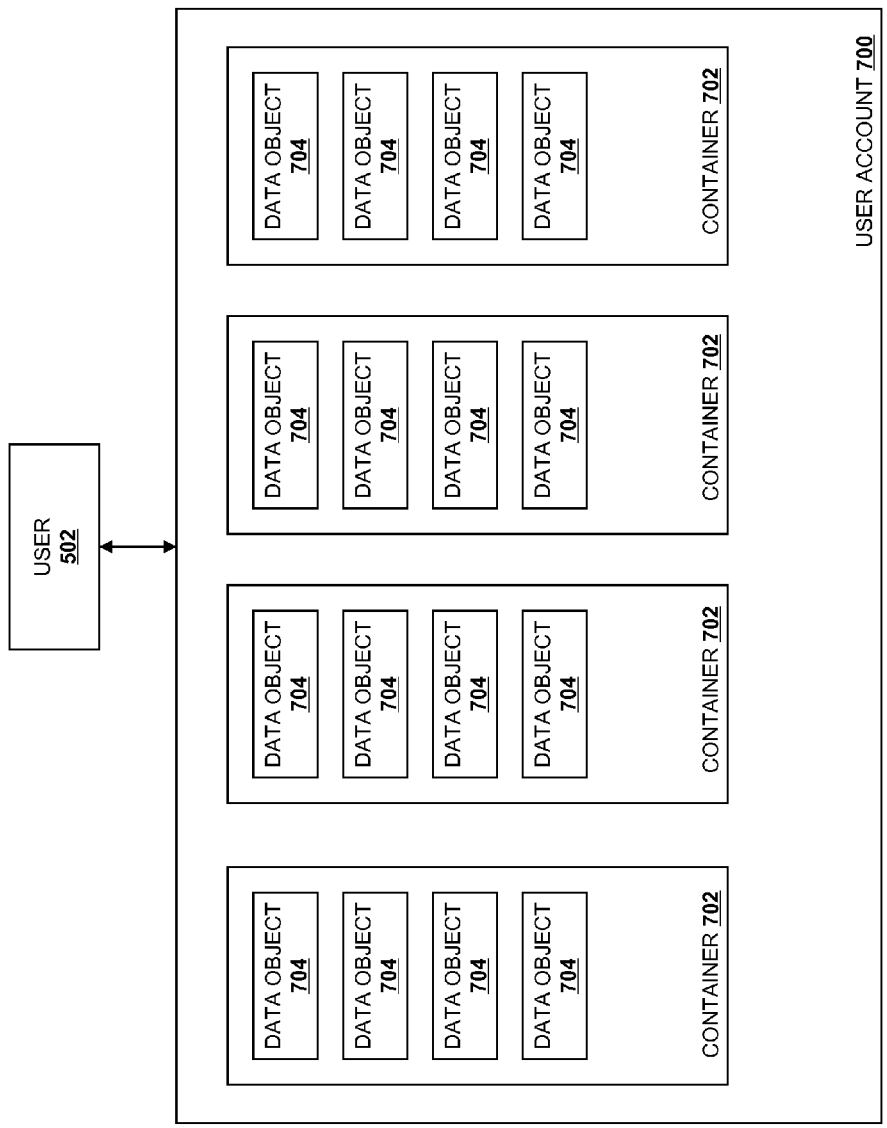
FIG. 7 is a schematic view of a user account storage structure according to one embodiment.

Referring now to FIG. 7, a particular user 502 interacts with the storage service 500 via the API to store and receive data objects. User 502 may create a plurality of containers 702 in the user account 700 and store a plurality of data objects 704 in each of the containers 702 for retrieval. In the discussion below, a user account is referred to as an "account," a container is referred to as a "container," and a data object is referred to as an "object" for clarity of discussion. One of skill in the art will recognize that the terms "account," "container" and "object" are generic forms of data naming that are used to direct the object storage service 500 to a specific data object. When other types of rings and services are used, an appropriate name may be substituted. For clarity, discussion of alternative rings and services will be limited to the "account," "container" and "object" rings and services. The account as shown in FIG. 7, as well as other rings and services, are consistent whether or not they are deployed on a logical structure within a single cluster, such as the structure illustrated in FIG. 7, or are arrayed across a multi-zone system, such as the structure illustrated in FIG. 6. When reference is made to the proxy 504, the rings 506, the services 508, 510, or 512, or the storage pools 514, equivalent structures are also contemplated within each zone 550a-n (specifically the proxies 554a-n, the rings 556a-n, the object/container services 558a-n, and the storage pools 560a-n). Similarly, equivalent structures to the proxy 504 and the rings 506 are contemplated relative to the multi-zone proxy 562 and the multi-cluster ring 564.

The components of the exemplary object storage service 500 and some of their functions will now be described in detail relative to various embodiments.

The Rings 506

As discussed above, the rings 506 are implemented in a tailored electrical circuit or as software instructions to be used in conjunction with a processor to create a hardware-software combination that implements the specific functionality described herein. To the extent that software is used to implement the rings, it may include software that is stored on a computer-readable medium location in the storage management server 516 and/or the storage servers 518. The rings 506 include semiconductor circuits and/or computer-executable instructions that, when executed by a processor, provide subsystems of the object storage service 500 that provide a mapping between the entities stored in the object storage service 500 and the locations of those entities in the storage pools 514. In the illustrated embodiment, the object storage service 500 includes a separate object ring 506a, container ring 506b, and account ring 506c, and when components of the object storage service 500 need to perform any operation on an object, container, or account, those components interact with the object ring 506a, container ring 506b, and account ring 506c, respectively, to determine the location of that stored entity in the storage pools 514. However, one of skill in the art will recognize that different ring structures may be provided (e.g., a single ring for the objects, containers, and accounts, more than one ring for each of the objects, containers, and account, etc.) without departing from the scope of the present disclosure. The rings 506 maintain the availability and safety of data in the object storage service 500 through the use of zones, partitions, replicas, and the storage pools 514, as described below.

In one embodiment, availability zones are defined across one or more of the storage pools 514 that are subject to a correlated loss of access or data as a result of a particular event. In addition, zones can be used for identification and management of other aspects of the system, such as the use of specific storage technology. One of skill in the art will recognize that the examples of zones provided above are not limiting, and a variety of zones known in the art will fall into the scope of the present disclosure.

Logically, a partition is an abstract storage bucket. As discussed in further detail below, the object storage service 500 maps each partition to a plurality of storage pools 514 that are in different zones, and stores data using those partitions. The mapping of a given partition to a plurality of storage pools 514 creates a plurality of partition replicas of that partition (e.g., equal to the number of storage pools 514 the partition is mapped to.) For example, when a given partition is mapped to 3 storage pools 514 that are in different zones, 3 partition replicas of that partition are created.

The object ring 506a for the management of objects will be described in detail below. However, one of skill in the art will recognize how the discussion may be applied to the container ring 506b, the account ring 506c, and/or a ring for any other stored entity, without departing from the scope of the present disclosure.

In various replicated, network-based object storage services, an object from a user is received by a proxy. To determine where the object should be stored, some attribute of the object or the object data itself is hashed. If necessary, some attribute of the object is modified so that three different results are returned from the hashing function. The object is then replicated and stored in the storage pool corresponding to the number returned by the hash function.

Under typical circumstances, a consistent hashing function is used as the hash function. The use of the consistent hashing function ensures that there will be minimal changes to the assigned storage pools given a change in membership due to adding or removing new storage pools.

Although the consistent hashing function results in minimal changes to the storage location, sometimes the assignments made by the consistent hashing function or the rearrangements needed due to a change in membership may have undesirable storage characteristics. For example, such methods have been found to result in multiple object replicas for the same object being stored in one or more storage pools that are in the same zone. As discussed above, this is undesirable because then multiple (and possibly all) object replicas for the same object are subject to being lost as a result of a particular event. Alternatively, rebalancing the replicas due to a change in membership has been found to require the movement to two of the replicas 4% of the time, and the movement of all three replicas 1% of the time. It is desirable to never have to move more than one replica at a time.

Figure 8:
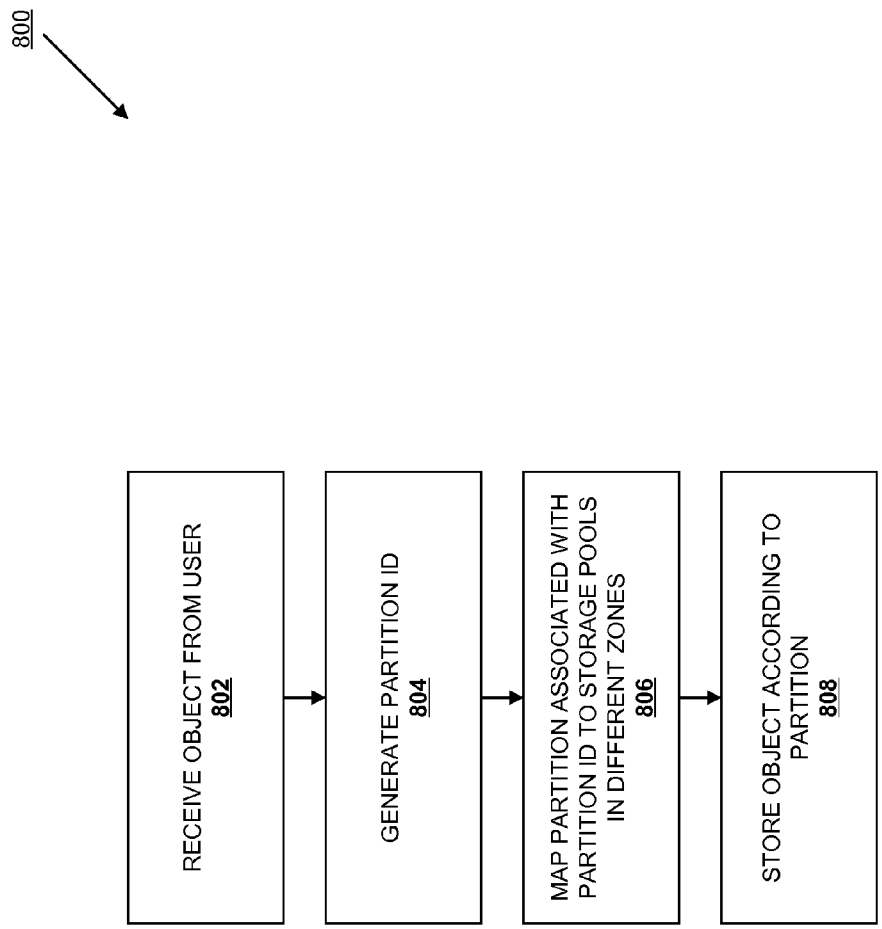
FIG. 8 is a flow chart illustrating a method for storing an object according to one embodiment.

In one embodiment, the object storage service 500 solves the problem of multiple object replicas for the same object being stored in storage pools that are in the same zone through the use of the rings 506. Referring now to FIG. 8, a method 800 for storing stored entities is illustrated. At block 802, an object us received by a user. In one embodiment, an object is received from the user 502 by the proxy 504. The method 800 then proceeds to block 804 where a partition identification is generated. In one embodiment, a consistent hash function is applied to the object received in block 802, and the hash function returns a partition identification that corresponds to a partition. The method 800 then proceeds to block 806 where the partition associated with the partition identification is mapped to storage pools that are in different zones. This mapping function is constrained so that the physical location of the storage pools is required to have one or more desirable properties, such as having each partition replica in a separate zone.

There are various embodiments of the constrained mapping function. In one embodiment, the constrained mapping function is the output of a constraint satisfaction solver, in which the desired storage characteristics (such as the requirement that each replica of a partition be in a different availability zone) are inputs to the solving function. The solver then uses one or more search methodologies within the solution space to find a storage layout that maps partitions to storage pools in a desirable manner.

In a second embodiment, a constrained mapping function is applied to portions of the partition identification (e.g., the portions of the partition identification that the constrained mapping function is applied to) may be bits of the output of the original hashing function is applied to the object. For example, the number of bits to which the constrained mapping function is applied may be known as the partition power, and 2 to the partition power may indicate the partition count. The constrained mapping function is designed to return a storage pool location for each portion of the partition identification to which it is applied, and the storage pool locations returned for a given partition identification will each correspond to storage pools 514 in different zones. These storage pool locations are then associated with the partition identification. Thus, the partition corresponding to the partition identification is replicated multiple times in the object storage service 500 (i.e., a partition replica is included in each storage pool corresponding to the storage pool locations determined from the constrained mapping function.) The method 800 then proceeds to block 808 where the object is stored according to the partition. The object received by the user 502 in block 802 of the method 800 may then be stored according to the partition corresponding to the partition identification, which results in multiple object replicas for the object being stored in storage pools that are in different zones in the object storage service 500. In another embodiment, the constrained mapping function is used to determined storage pool locations that are in different zones for each partition prior to the object being received by the user 502, discussed in further detail below.

The output of the constrained mapping function signifies a particular storage pool where a replica of the partition should be stored. An example of this output is as follows: When an object is received from the user 502 at block 802 of the method 800, and at block 804 of the method 800, a hash function is applied to the object. In one exemplary embodiment, the user 502 provides data including an account/container/object name to the proxy 504, and a hash function is applied to the account/container/object name as follows:

Hash function (account/container/object name)==123456789

Where 123456789 is the partition identification that is returned by the hash function. At block 806 of the method 800, the partition mapping number may then be divided into 3 parts (e.g., the first three digits, the second three digits, and the third three digits of the partition identification,) and the constrained mapping function is applied to each of those parts:

Constrained mapping function (123)==storage pool location (zone 1)
Constrained mapping function (456)==storage pool location (zone 7)
Constrained mapping function (789)==storage pool location (zone 3)

As discussed above, the constrained mapping function is designed to return the storage pool location (zone 1), storage pool location (zone 7), and storage pool location (zone 3) that correspond to storage pools that are in different zones (e.g., zones 1, 3, and 7). The storage pools locations are then associated with the partition identification:

Partition identification: (storage pool location (zone 1), storage pool location (zone 7), storage pool location (zone 3)

Thus, the partition corresponding to the partition identification is replicated across storage pools that are in different zones (here, zones 1, 3, and 7.) At block 808 of the method 800, the object received from the user 502 is then stored, using the partition corresponding to the partition identification, in each of the storage pools corresponding to the storage pool locations returned by the application of the constrained mapping function to portions of the partition identification. Thus, 3 replicas of the object received from the user 502 are stored in the object storage service 500 in storage pools that are located in different zones (zones 1, 3, and 7.) In one embodiment, each of the storage pool locations are IP addresses, i.e., when each of the storage pools are separate storage servers. In one embodiment, the constrained mapping function is a hash function. However, one of skill in the art will recognize that a variety of functions may be used to ensure that each partition is mapped to storage pools that are in different zones without departing from the scope of the present disclosure.

In another embodiment, the constrained mapping function is applied to the object storage service 500 before the object is received by the user 502 at block 802 in order to accomplish the mapping of the partitions to storage pools described above with reference to block 806 of the method 800. For example, the total number of partitions and the total number of storage servers/storage pools in the object storage service 500 may (and typically will) be known. With that knowledge, the constrained mapping function is used to map each partition in the object storage service 500 to a plurality of storage pools that are in different zones, and that information is stored in a constrained mapping database. For example, a constrained mapping database may include partitions mapped to storage pools such as:

Partition 1: storage pool location (zone 1), storage pool location (zone 2), storage pool location (zone 3)
Partition 2: storage pool location (zone 4), storage pool location (zone 5), storage pool location (zone 6)
Partition 3: storage pool location (zone 7), storage pool location (zone 8), storage pool location (zone 9)

In one embodiment, the output of the constrained mapping function can be saved for optimized lookup. For example, the saved output may be embodied in a file provided to each of the storage pools 514, or stored in a database that is available for the appropriate systems to query. If the saved output is contained within a file, the storage pools 514 may then periodically check the modification time of this file and reload their in-memory copies of the ring structure as needed.

Thus, when an object is received from a user 502 at block 802, the hash function is applied to that object to get the partition identification (e.g., partition 1, 2, or 3 in the example above) at block 804, and then at block 806, the partition identification may then be used with the constrained mapping database to determine the corresponding partition and its associated storage pool locations. This embodiment allows the processing necessary to map partitions to multiple storage pools in different zones to be conducted before objects are received from users so that such processing does not have to be conducted each time an object is received from a user.

Figure 9:
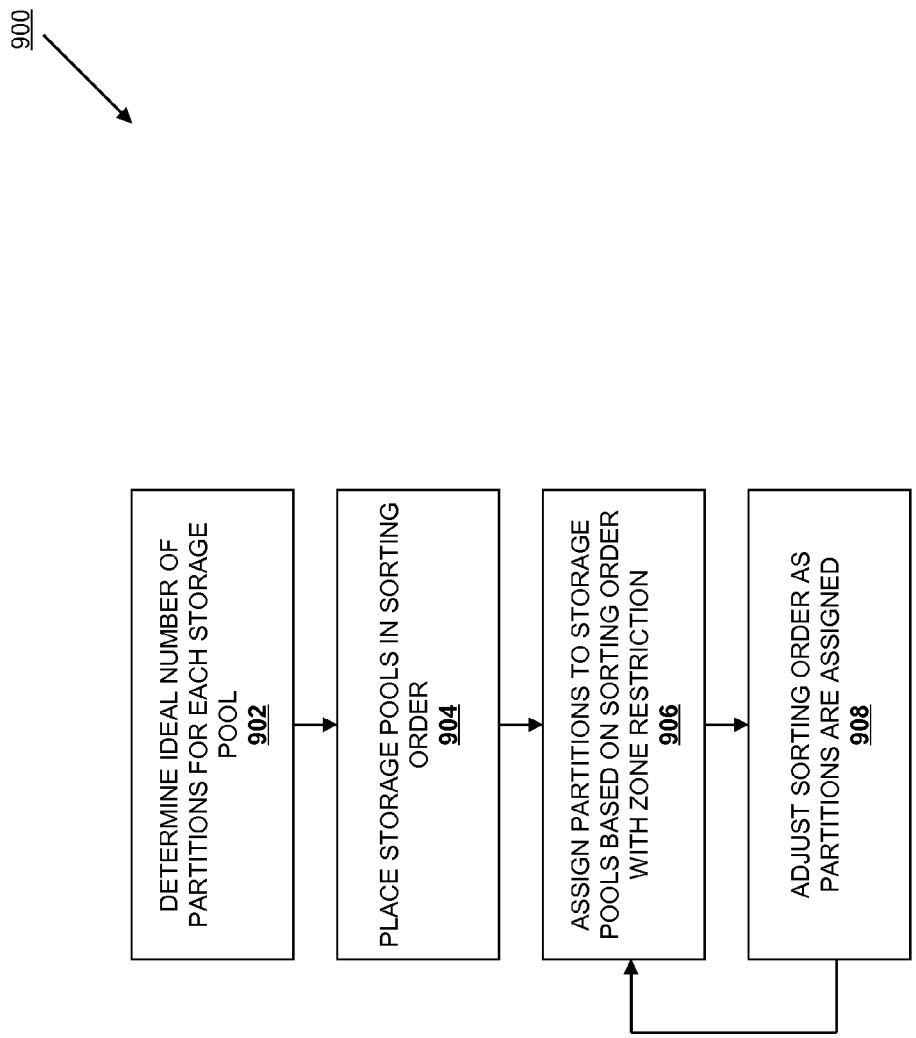
FIG. 9 is a flow chart illustrating an embodiment of a method for creating a ring according to one embodiment.

For example, referring now to FIG. 9, a method for building a ring 506 is illustrated. At block 902, an ideal number of partitions for each storage pool in the object storage system 500 is determined. In one embodiment, the number of partitions that should ideally be assigned to each storage pool 514 is calculated based the weight (e.g., storage capacity) of each storage pool 514. For example, if the partition power is 20, the ring 506 will have 1,048,576 (220) partitions. If there are 1,000 storage pools 514 of equal weight, each storage pool 514 will ideally be assigned 1,048.576 partitions. This may be referred to as an ideal partition count, and in the example, each storage pool 514 starts off empty with a 1,048.576 ideal partition count. The method 900 then proceeds to block 904 where the storage pools are placed in a sorting order. In one embodiment, the storage pools 514 are placed in a sorting order based on their ideal partition count (e.g., highest to lowest), and this sorting order is maintained throughout the method 900 as partitions are assigned storage pools 514. The method 900 then proceeds to block 906 where partitions are assigned to storage pools based on their sorting order but with a zone restriction. In one embodiment, the partitions are assigned to the storage pool 514 with the highest ideal partition count, but subject to the restriction that the storage pool 514 to which a partition is being assigned is not in the same zone as any other storage pool 514 that includes a partition replica for that same partition. The method 900 then proceeds to block 908 where the sorting order of the storage pools is adjusted. In one embodiment, once a partition is assigned to a storage pool 514, that storage pool 514 will have its ideal partition count decremented and thus that storage pool 514 is moved to a lower position in the sorting order, and the method 900 then returns to block 906 to continue to assign partitions to storage pools based on their sorting order but with the zone restriction. In such a manner, each partition is assigned multiple storage pools 514 in different zones, and thus objects received from users may have multiple object replicas stored in storage pools in different zones simply by associating those objects with the partitions.

As mentioned above, another problem relates to the rebalancing of object replicas stored in the object storage system due to changing membership (i.e., adding or subtracting storage servers or storage pools from the object storage system.) Such methods have been found to require the moving of multiple object replicas of the same object in response to a membership change, which is undesirable.

In one embodiment, the mapping of partitions to multiple storage pools in different zones in the object storage system 500 described above solves these problems. The use of the constrained mapping function to ensure that each partition is mapped to storage pools in different zones ensures that object replicas for the same object are never located in storage pools 514 that are in the same zone (i.e., because any given object received from a user is stored in a partition that is replicated in storage pools that are in different zones.) For example, with each storage server 108 defined as a separate zone, the addition or subtraction of a given storage server 108 from the object storage system 500 thus can only effect one partition replica, and hence one object replica of a given object (i.e., because only one of the partition replica will ever be located on a storage server that is defined as a separate zone.) In similar fashion, the rebalancing associated with changing the zone membership can be accomplished without affecting more than one replica because each zone is guaranteed to only contain one replica of a given partition.

Figure 10:
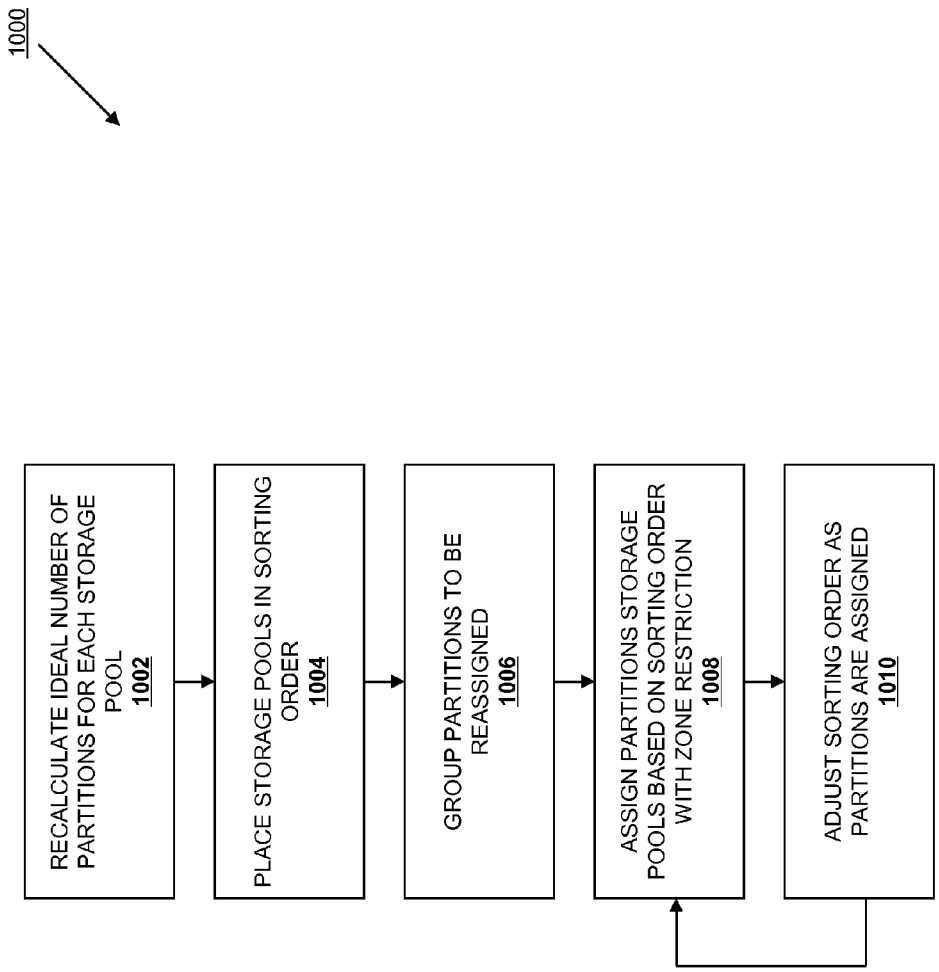
FIG. 10 is a flow chart illustrating an embodiment of a method for reassigning partitions in a ring according to one embodiment.

Periodically, partitions may need to be reassigned to different storage pools 514, and the reassignment of partitions will result in the building of a new ring from an old ring. Such an event may occur due to the removal and/or addition of a storage pool 514 from the object storage system 500 (e.g., a membership change.) Referring now to FIG. 10, a method 1000 for reassigning partitions in response to the removal of a storage pool is illustrated. The method 1000 begins at block 1002 where the ideal number of partitions for each storage pool is recalculated. In one embodiment, the ideal partition count for the storage pools 514 remaining in the object storage system 500 (subsequent to the removal of a storage pool) are recalculated. The method 1000 then proceeds to block 1004 where the storage pools are placed in a sorting order as described above with reference to block 904 of the method 900. The method then proceeds to block 1006 where partitions to be reassigned are grouped. In one embodiment, a partition list for the partitions to be reassigned is created. For example, any storage pools 514 that have been removed from the object storage system 100 may have all their assigned partitions unassigned and added to the partition list, and any storage pools 514 that have more partitions than their ideal partition count may have random partitions unassigned from them and added to the partition list (i.e., such that those storage pools have a number of partitions that is within a predetermined amount of their ideal partition count.) The partitions on the partition list may then be reassigned to the storage pool 514 in blocks 1008 and 1010 of the method 1000 substantially as discussed above with reference to blocks 906 and 908 of the method 900. In one embodiment, at block 1008 of the method 1000, whenever a partition is reassigned to a storage pool 514, the time of the reassignment is recorded. Reassignment times may be used when gathering partitions to reassign to storage pools 514, such that no partition replica for a given partition is moved twice in a predetermined amount of time. However, such reassignment restrictions based on reassignment times may be ignored for partition replicas on storage pools 514 that have been removed from the object storage system 500, as removing a storage pool 514 only happens upon storage pool 514/storage server 518 failure and thus requires the reassignment of the partitions.

In one embodiment, the method 1000 is conducted periodically to help balance the amount of data stored by storage pools 514 in the object storage system 500. For example, the partition reassignment method 1000 discussed above may repeated until each storage pool 514 is within a predetermined threshold of a predetermined storage capacity (e.g., within 1% of 100% storage capacity for that storage pool) or when it is determined that partition reassignment will not improve the balance of data stored by the object storage system 500 by more than a predetermined amount. For example, if a first storage server 108 includes 2 TB of storage, a second storage server 108 includes 4 TB of storage, and a third storage server 108 includes 10 TB of storage, data balancing may be conducted to ensure that each of the storage servers 108 holds the same percentage of its storage capacity (i.e., the first storage server 108 holds 0.66 TB of data, the second storage server 108 holds 1.33 TB of data, and the third storage server 108 holds 2 TB of data such that each of the storage servers 108 is at 33% of its storage capacity.) Weights may be applied to storage servers 108 to balance the distribution of data on the storage servers 108 in the object storage system 500 to account for different storage capacities.

Those of skill in the art will recognize that the constrained mapping within the rings 506 is modifiable to deal with more than issues of availability. Even though the embodiment above has been described in terms of availability zones, any type of zone can be used for the mapping from partition to storage device.

In some implementations the constrained mapping is extensible via a plugin mechanism. The constrained mapping function is a rule-based hash, and so it can be extended similarly to other rule-based plugin mechanisms described herein. In one embodiment, the ring 506 has an API by which mapping rules can be set by user 502. In a second embodiment, a series of rules can be provided and loaded by the ring 506. This loadable ruleset can be implemented using a dynamically loadable or runnable program that has a series of expected inputs and provides its information on a defined series of outputs. In one embodiment these are "stdin" and "stdout." In a second embodiment, these are provided as function calls within a program module. When set of partitions is provided to the plugin, the constrained mapping function logically associates it with a particular resource and assigns the virtual partition to the applicable physical resource. When a request arrives addressed to that resource, the tenant-defined rules and filters are applied to the request and the appropriate object is uploaded, downloaded, edited, or redirected accordingly. In a further embodiment, the API provided to the user 502 is sufficient to for the user to direct the creation of the ring structure via interaction with a remote, user-controlled entity on the network.

There are two levels at which the user can direct the allocation of underlying resources via the plugin mechanism. At a first, high level, the user can present weights, correlations, or affinities between different groups of resources so that an underlying cloud-provider-specific ring generation function can take those into account. In a second embodiment, the user can have direct control over the allocation of storage resources and those can be mapped onto available physical resources provided by the cloud provider. Plugging into the constraint mapping portion of the ring generation function is sufficient for both levels of control, but it is anticipated that different cloud providers will favor or provide one level of control over another.

Object Service 508

As discussed above, the object service 508 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 516 and/or the storage servers 518. The object service 508 may include instructions that, when executed by a processor, provide object storage and objection manipulation functionality such that the object service 508 is operable to, for example, store, retrieve and delete stored objects in the storage pools 514. In one embodiment, an object service 508 is provided for each storage pool that holds object data. For example, an object service 508 may be included on a server that further includes one or more storage drives that provide a storage pool for objects. In one embodiment, the objects are stored as binary files with metadata stored as extended attributes of the file in the filesystem used by the object storage service. In such an embodiment, the object service 508 will uses the extended attributes of the filesystem to manage the metadata. In a second embodiment, the metadata is stored in a machine-readable format next to the data itself. For example, the metadata for a file is stored in a text file or single file database.

In one embodiment, subsequent processing based on file metadata is also pluggable by the end user. For example, one embodiment stores different sets of files and associates them with the same URL. An ordinary operation to read or modify the object could also have a "processor" function associated with it that allows for user-directed modification or logging of the request.

In one embodiment, objects are stored by the object service 508 using a path derived by applying a hash function to the name of the object along with a timestamp. For example, an incoming object for a user account to be written to a container will have a hash applied to its account/container/object name and the path generated for the object is:

/objects/<partition>/<storage pool location>/objectname_hash.15673.data where "objects" indicate that the object data is stored in an object storage pool 514, <partition> is the partition identification that maps the object to a partition, <storage pool location> is the storage pool location that maps the partition replica to a storage pool 514 in a different zone than its related partition replicas, objectname_hash is the hash of the account/container/object name, and 15672 is the timestamp.

When there is a request for an object, the object storage service 500 will find all the object replicas in the object storage service 500 that include the objectname_hash and return the object data that has the most recent timestamp value. Special care is needed to record updates that should be persisted as the new canonical value. For example, when an object replica is deleted, a modification sentinel (e.g., a 0 byte "tombstone" file or ".ts" file) is written to the storage pool 514 where the deleted object replica was located and that includes the same objectname_hash as the deleted object replica (i.e., /objectname_hash.15784.ts,) and that tombstone file stays in the object storage service 500 for a predetermined amount of time (e.g., 7 days.) During object replication, discussed in further detail below, when the object storage service 500 encounters a tombstone file, the object storage service 500 checks whether the tombstone file has been in the system for 7 days. If not, the object storage service 500 searches for and deletes any object replicas that it finds related to that tombstone file (e.g., replicas that same objectname_hash as the tombstone file) to ensure that objects that were meant to be deleted from the object storage service 500 are removed and older versions of object replicas of a given object do not appear in the object storage service 500 due to, for example, the temporary failure of a storage server 516 or storage pool 514 that might have prevented the deletion of that object replica previously. If the object storage service 500 determines that a tombstone file has been in the object storage service 500 for longer than the predetermined time, that tombstone file is deleted.

The mechanism used for recording file deletion is also used to record other types of updates. For example, a "purge" marker indicates that the system should overwrite all copies of the object and set the space to free; a "version" marker indicates that the system should create a copy and mark the copy with a version number; and a "ttl" (time-to-live) marker indicates that the system should check an authoritative source for updates after the expiry of a set time period. Other types of out-of-band changes to the file are also contemplated.

Container Service 510

As discussed above, the container service 510 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 516 and/or the storage servers 518. The container service 510 may include instructions that, when executed by a processor, provide container storage and container manipulation functionality such that the container service 510 is operable to store, retrieve and delete stored containers in the storage pools 514. In one embodiment, a container service 510 is provided for each storage pool that holds container data. For example, a container service 510 may be included on a server that further includes one or more storage drives that provide a storage pool for containers, and the container service 510 may include the names of containers and objects in those containers. Thus, in one embodiment, the container service 510 handles the listing of containers, and does not hold the location where the objects are stored (e.g., the storage pool where a given object replica resides), but rather the locations of containers that hold the objects. The listings for the container locations may be stored as database files, and those listings may be replicated across the storage pools 514 in a manner that is similar to the replication of objects (e.g., through their association with partitions) as discussed above. Container storage statistics for the container service(s) 510 may be tracked by the object storage service 500 and may include total number of objects stored by one or more containers, the total storage provided by any given container, and/or a variety of other statistics known in the art.

Account Service 512

As discussed above, the account service 512 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 516 and/or the storage servers 518. The account service 512 may include instructions that, when executed by a processor, provide account storage and account manipulation functionality such that the account service 512 is operable to store, retrieve and delete stored accounts in the storage pools 514. In one embodiment, an account service 512 is provided for each storage pool that holds account data. For example, an account service 512 may be implemented by a server that includes storage drives that provide a storage pool for accounts, and the account service 512 may include the names of accounts and containers in those accounts. Thus, the account service 512 is very similar to the container service 510, discussed above, with the exception that account storage 512 handles the listings of accounts.

Other Services

As discussed above, other types of services may be implemented in similar fashion to the object, container, and account services described above. For example, one implementation includes an authorization service. The authorization service may include instructions that, when executed by a processor, handle the storage and manipulation of authorization metadata so that the authorization service is operable to store, retrieve, delete, and query stored credentials from in the storage pools 514. In one embodiment, an authorization service provides an ACL-based authorization. In a second embodiment, the authorization service provides posix-compatible authorization. In a third embodiment, the authorization service provides tree or graph-based authorization, such as would be provided with an LDAP-based authorization service.

A second implementation includes a structured data service. The structured data service may include instructions that, when executed by a processor, provide the storage and manipulation of structured data such that the structured data service is operable to store, retrieve, delete, and query tabular, graph, or tree-based data from in the storage pools 514. In one embodiment, a structured data service provides a JSON-based output. In a second embodiment, the structured data service provides XML-based output. In a third embodiment, the structured data service provides HTML output.

Proxy 504

The proxy 504 is implemented in a tailored electrical circuit or as software instructions to be used in conjunction with a processor to create a hardware-software combination that implements the specific functionality described herein. The proxy 504 is responsible for tying together the object storage service 500. For each request received from a user, the proxy 504 determines the location of the account, container, or object in the appropriate ring 506 (e.g., the object ring 506*a*, the container ring 506*b*, or the account ring 506*c*,) and routes the request accordingly. A public Application Programming Interface (API) may be exposed to users through the proxy 504. A large number of failures may be handled by the proxy 504. For example, if a storage server 516 and/or storage pool 514 is unavailable for an object PUT, the proxy 504 may use the rings 506 to determine an appropriate storage server 516 and/or storage pool 514 for that object and route the object there instead.

In another embodiment, there are multiple proxies associated with an object storage service. The existence of multiple proxies may be ascertainable from outside the object storage service, or it may be transparent. Different proxies may be used for different purposes. For example, in one embodiment different proxies are used for different types of files. In another embodiment, different proxies are used for different types of requests. In a third embodiment, an appropriate proxy is chosen to minimize latency, geographic, or network distance between the proxy and the system making the request.

Container API

In one embodiment, APIs for Ring, Account, Container, and other services are defined in terms of REST calls, typically executed over HTTP. These have the general structure:

METHOD/v1/<account>HTTP/1.1 although subsidiary calls may be useful to address particular parts of the object storage namespace, such as:

METHOD/v1/<account>/<container>HTTP/1.1 for container API calls.

In one embodiment, GET operations against the X-Storage-Url for an account are performed to retrieve a list of existing storage containers ordered by name. The following list are optional query parameters that are supported with this request limit: For an integer value n, limits the number of results to at most n values.

marker: Given a string value x, return object names greater in value than the specified marker.

format: Specify a format for the response, such as json or xml for the respective serialized response.

Using these parameters, an example container list request would be formatted as:

```
GET /<api version>/<account> HTTP/1.1
Host: storage.example.com
X-Auth-Token: eaaafd18-0fed-4b3a-81b4-663c99ec1cbb
```

In this example, a list of containers is returned in the response body, one container per line. A 204 (No Content) HTTP return code is passed back if the account has no containers. For example:

```
HTTP/1.1 200 Ok
Date: Thu, 07 Jun 2010 18:57:07 GMT
Server: Apache
Content-Type: text/plain; charset=UTF-8
Content-Length: 32
images
movies
documents
backups
```

If a format=xml or format=json argument is appended to the storage account URL, the service will serve extended container information serialized in the chosen format. The sample responses below are formatted for readability. For a JSON response:

```
GET /<api version>/<account>?format=json HTTP/1.1
Host: storage.example.com
Content-Length: 0
X-Storage-Token: 182f9c0af0e828cfe3281767d29d19f4
```

The server response is:

```
HTTP/1.1 200 OK
Date: Tue, 25 Nov 2008 19:39:13 GMT
Server: Apache
Content-Type: application/json; charset=utf-8
[
    {"name":"test_container_1", "count":2, "bytes":78},
    {"name":"test_container_2", "count":1, "bytes":17}
]
```

If an XML response is specified, the server response is:

```
HTTP/1.1 200 OK
Date: Tue, 25 Nov 2008 19:42:35 GMT
Server: Apache
Content-Type: application/xml; charset=utf-8
<?xml version="1.0" encoding="UTF-8"?>
    <account name="AccountName">
        <container>
            <name>test_container_1</name>
            <count>2</count>
            <bytes>78</bytes>
        </container>
        <container>
            <name>test_container_2</name>
            <count>1</count>
            <bytes>17</bytes>
        </container>
    </account>
```

In some embodiments, it is useful to limit the number of responses or to stream responses beyond a certain number. In one embodiment, the system returns a maximum of 10,000 container names per request. To retrieve subsequent container names, another request must be made with a 'marker' parameter. The marker indicates where the last list left off; the system will return container names greater than this marker, up to 10,000 again. Note that the 'marker' value should be URL-encoded prior to sending the HTTP request. If 10,000 is larger than desired, a 'limit' parameter may be given. If the number of container names returned equals the limit given (or 10,000 if no limit is given), it can be assumed there are more container names to be listed. If the container name list is exactly divisible by the limit, the last request will simply have no content. For example, a container with five names (apples, bananas, kiwis, oranges, and pears) will respond as follows with a limit of two:

```
GET /<api version>/<account>?limit=2
Host: storage.example.com
X-Auth-Token: eaaafd18-0fed-4b3a-81b4-663c99ec1cbb
apples
bananas
```

Since we received two items back, we can assume there are more container names to list, so we make another request with a marker of the last item returned:

```
GET /<api version>/<account>?limit=2&marker=bananas
Host: storage.example.com
X-Auth-Token: eaaafd18-0fed-4b3a-81b4-663c99ec1cbb
kiwis
oranges
```

Again, two items are returned; there may be more:

```
GET /<api version>/<account>?limit=2&marker=oranges
Host: storage.example.com
X-Auth-Token: eaaafd18-0fed-4b3a-81b4-663c99ec1cbb
pears
```

With this one-item response we received less than the limit number of container names, indicating that this is the end of the list.

In another embodiment, HEAD operations against an account are performed to retrieve the number of containers and the total bytes stored in the object storage for the account. In one embodiment, this information is returned in two custom headers, X-Account-Container-Count and X-Account-Bytes-Used. Those of skill in the art will recognize that because the storage system is designed to store large amounts of data, care should be taken when representing the total bytes response as an integer; when possible, convert it to a 64-bit unsigned integer if your platform supports that primitive type. An example account metadata request is as follows:

```
HEAD /<api version>/<account> HTTP/1.1
Host: storage.example.com
X-Auth-Token: eaaafd18-0fed-4b3a-81b4-663c99ec1cbb
```

The HTTP return code will be 204 (No Content) if the request succeeds. A 401 (Unauthorized) will be returned for an invalid account or access key. One exemplary response is:

```
HTTP/1.1 204 No Content
Date: Thu, 07 Jun 2010 18:57:07 GMT
Server: Apache
X-Account-Container-Count: 3
X-Account-Bytes-Used: 323479
```

In one embodiment, REST operations can be performed on containers. All operations are valid HTTP request methods as described above. The following list are optional query parameters that are supported with this request
  limit: For an integer value n, limits the number of results to at most n values.
  marker: Given a string value x, return object names greater in value than the specified marker.
  format: Specify a format for the response, such as json or xml for the respective serialized response.
  prefix: For a string value x, causes the results to be limited to object names beginning with the substring x.
  path: For a string value x, return the object names nested in the pseudo path (assuming preconditions are met—see below).
  delimiter: For a character c, return all the object names nested in the container (without the need for the directory marker objects).
  filter: Specify an expression and return results that match (or do not match) the filter expression.
An example list objects request is as follows:

```
GET /<api version>/<account>/<container>[?parm=value] HTTP/1.1
Host: storage.example.com
X-Auth-Token: eaaafd18-0fed-4b3a-81b4-663c99ec1cbb
```

In one embodiment, a list of objects is returned in the response body, one object name per line. A 204 (No Content) HTTP return code will be passed back if the container is empty or does not exist for the specified account. If an incorrect account is specified, the HTTP return code will be 404 (Not Found). The following are exemplary responses. For a response with no format specified:

```
HTTP/1.1 200 Ok
Date: Thu, 07 Jun 2010 18:50:19 GMT
Server: Apache
Content-Type: text/plain; charset=UTF-8
Content-Length: 171
kate_beckinsale.jpg
How To Win Friends And Influence People.pdf
moms_birthday.jpg
poodle_strut.mov
Disturbed - Down With The Sickness.mp3
army_of_darkness.avi
the_mad.avi
```

If a format=xml or format=json argument is appended to the storage account URL, the service will serve extended object information serialized in the chosen format. Other than the ?format=xml|json parameter, it will return the same status/errors codes. The sample responses below are formatted for readability. For a JSON response:

```
GET /<api version>/<account>/<container>?format=json HTTP/1.1
Host: storage.example.com
Content-Length: 0
X-Storage-Token: 182f9c0af0e828cfe3281767d29d19f4
```

The server response is:

```
[
    {"name":"test_obj_1",
     "hash":"4281c348eaf83e70ddce0e07221c3d28",
     "bytes":14,
     "content_type":"application\/octet-stream",
     "last_modified":"2009-02-03T05:26:32.612278"},
    {"name":"test_obj_2",
     "hash":"b039efe731ad111bc1b0ef221c3849d0",
     "bytes":64,
     "content_type":"application\/octet-stream",
     "last_modified":"2009-02-03T05:26:32.612278"},
]
```

If an XML response is specified, the server response is:

```
HTTP/1.1 200 OK
Date: Tue, 25 Nov 2008 19:42:35 GMT
Server: Apache
Content-Length: 643
Content-Type: application/xml; charset=utf-8
<?xml version="1.0" encoding="UTF-8"?>
<container name="test_container_1">
  <object>
    <name>test_object_1</name>
    <hash>4281c348eaf83e70ddce0e07221c3d28</hash>
    <bytes>14</bytes>
    <content_type>application/octet-stream</content_type>
    <last_modified>2009-02-03T05:26:32.612278</last_modified>
  </object>
  <object>
    <name>test_object_2</name>
    <hash>b039efe731ad111bc1b0ef221c3849d0</hash>
    <bytes>64</bytes>
    <content_type>application/octet-stream</content_type>
    <last_modified>2009-02-03T05:26:32.612278</last_modified>
```

-continued

```
    </object>
</container>
```

In one embodiment, a list of objects is returned in the response body, one object name per line. A 204 (No Content) HTTP return code will be passed back if the container is empty or does not exist for the specified account. If an incorrect account is specified, the HTTP return code will be 404 (Not Found). The following are exemplary responses. For a response with no format specified:

```
HTTP/1.1 200 Ok
Date: Thu, 07 Jun 2010 18:50:19 GMT
Server: Apache
Content-Type: text/plain; charset=UTF-8
Content-Length: 171
kate_beckinsale.jpg
How To Win Friends And Influence People.pdf
moms_birthday.jpg
poodle_strut.mov
Disturbed - Down With The Sickness.mp3
army_of_darkness.avi
the_mad.avi
```

If a filter=expression argument is appended to the storage account URL, the service will process the filter expression and return information that matches the filter. A filter can be formulated to include or exclude certain objects automatically, and may have access to various set API calls or account constants. For example, in one embodiment a filter is defined by a URL-encoded regular expression. For example, a filter could be used to only return content-types that correspond to video types (such as .avi or .mov). For example, a filter expression such as .*(\.mov|\.avi|\.wmv)$ matches any filenames that end with the common video extensions .mov, .avi, and .wmv. This expression is URL encoded and used as a filter as follows:

```
GET /<api version>/<account>/<container>?filter=.*(\.mov|\.avi|\.wmv)%24
    HTTP/1.1 Host: storage.example.com
    Content-Length: 0
    X-Storage-Token: 182f9c0af0e828cfe3281767d29d19f4
```

The server response is:

```
HTTP/1.1 200 Ok
Date: Thu, 07 Jun 2010 18:50:19 GMT
Server: Apache
Content-Type: text/plain; charset=UTF-8
Content-Length: 171
poodle_strut.mov
army_of_darkness.avi
the_mad.avi
```

In one embodiment, listing a large number of objects is handled in the same fashion as listing a large number of containers; the system will return a maximum of 10,000 object names per request. To retrieve subsequent object names, another request must be made with a 'marker' parameter. The marker indicates where the last list left off and the system will return object names greater than this marker, up to 10,000 again. Note that the 'marker' value should be URL encoded prior to sending the HTTP request. If 10,000 is larger than desired, a 'limit' parameter may be given. If the number of object names returned equals the limit given (or 10,000 if no limit is given), it can be assumed there are more object names to be listed. If the container name list is exactly divisible by the limit, the last request will simply have no content.

In one embodiment, the API allows the creation and manipulation of containers. Containers are storage compartments for your data. PUT operations against a storage container are used to create the container. For example, a request to create a container would be as follows:

```
PUT /<api version>/<account>/<container> HTTP/1.1
Host: storage.example.com
X-Auth-Token: eaaafd18-0fed-4b3a-81b4-663c99ec1cbb
```

No content is returned. A status code of 201 (Created) indicates that the container was created as requested. Container PUT requests are idempotent and a code of 202 (Accepted) is returned when the container already existed. A sample response follows:

```
HTTP/1.1 201 Created
Date: Thu, 07 Jun 2010 18:50:19 GMT
Server: Apache
Content-Type: text/plain; charset=UTF-8
```

DELETE operations against a storage container are used to permanently remove that container. In one embodiment, the container must be empty before it can be deleted. A HEAD request against the container can be used to determine if it contains any objects. An example delete request is as follows:

```
DELETE /<api version>/<account>/<container> HTTP/1.1
Host: storage.example.com
X-Auth-Token: eaaafd18-0fed-4b3a-81b4-663c99ec1cbb
```

In one embodiment, no content is returned. A status code of 204 (No Content) indicates success, 404 (Not Found) is returned if the requested container was not found, and a 409 (Conflict) if the container is not empty. No response body is generated. For example:

```
HTTP/1.1 204 No Content
Date: Thu, 07 Jun 2010 18:57:07 GMT
Server: Apache
Content-Length: 0
Content-Type: text/plain; charset=UTF-8
```

In one embodiment, HEAD operations against a storage container are used to determine the number of objects, and the total bytes of all objects stored in the container, and for other metadata requests. For example:

```
HEAD /<api version>/<account>/<container> HTTP/1.1
Host: storage.example.com
X-Auth-Token: eaaafd18-0fed-4b3a-81b4-663c99ec1cbb
```

The HTTP return code will be 204 (No Content) if the container exists, and 404 (Not Found) if it does not. The object count and utilization are returned in the X-Container-Object-Count and X-Container-Bytes-Used headers respectively. For example:

```
HTTP/1.1 204 No Content
Date: Wed, 11 Jul 2010 19:37:41 GMT
Content-type: text/html
X-Container-Object-Count: 7
X-Container-Bytes-Used: 413
```

In another embodiment, it is useful to have the objects representable in a virtual hierarchy that is different from an "actual" storage hierarchy. In such an embodiment, the container storage uses paths or delimiters to represent different portions of the hierarchy. For example, in an embodiment supporting virtual hierarchies, the following objects are uploaded to the storage system with names representing their full filesystem path:

```
photos/animals/dogs/poodle.jpg
photos/animals/dogs/terrier.jpg
photos/animals/cats/persian.jpg
photos/animals/cats/siamese.jpg
photos/plants/fern.jpg
photos/plants/rose.jpg
photos/me.jpg
```

Using prefix and delimiter in a GET request we can traverse these virtual directories. Only the request line and results are depicted below excluding other request/response headers:

```
GET /v1/AccountString/backups?prefix=photos/&delimiter=/ HTTP/1.1
Host: storage.example.com
X-Auth-Token: eaaafd18-0fed-4b3a-81b4-663c99ec1cbb
photos/animals/
photos/cats/
photos/me.jpg
```

In one embodiment, any single character can be used as a delimiter. The listings can return virtual directories—they are virtual in that they don't actually represent real objects, and will be listed in a subdir section of json and xml results. In one embodiment, it is possible to use directory markers with prefix and delimiter, as they will be listed as regular files but with Content-Type of application/directory.

In one embodiment, objects stored in the system can be saved, modified, deleted, or otherwise manipulated using the REST API. Metadata for an object can be included by adding custom HTTP headers to the request and the data payload as the request body.

In one embodiment, GET operations against an object are used to retrieve the object's data. Conditional GET requests can be made by using certain HTTP headers as documented in RFC 2616, including: If-Match, If-None-Match, If-Modified-Since, and If-Unmodified-Since. In addition, some embodiments may also support an X-Object-Filter header having similar functionality to the filter parameter for object names. It is also possible to fetch a portion of data using the HTTP Range header, such as by using OFFSET and/or LENGTH. For example, a GET request for an object is as follows:

```
GET /<api version>/<account>/<container>/<object> HTTP/1.1
Host: storage.example.com
X-Auth-Token: eaaafd18-0fed-4b3a-81b4-663c99ec1cbb
```

The object's data is returned in the response body. Object metadata is returned as HTTP headers. A status of 200 (Ok) indicates success; status 404 (Not Found) is returned if no such object exists. The server response is:

```
HTTP/1.1 200 Ok
Date: Wed, 11 Jul 2010 19:37:41 GMT
Server: Apache
Last-Modified: Fri, 12 Jun 2010 13:40:18 GMT
ETag: b0dffe8254d152d8fd28f3c5e0404a10
Content-type: text/html
Content-Length: 512000
[ ... ]
```

In one embodiment, PUT operations are used to write, or overwrite, an object's metadata and content. In a further embodiment, end-to-end data integrity can be ensured by including an MD5 checksum of the object data in the ETag header. The HTTP response will include the MD5 checksum of the data written to the storage system. Objects can be assigned custom metadata by including additional HTTP headers on the PUT request. For example:

```
PUT /<api version>/<account>/<container>/<object> HTTP/1.1
Host: storage.example.com
X-Auth-Token: eaaafd18-0fed-4b3a-81b4-663c99ec1cbb
ETag: 8a964ee2a5e88be344f36c22562a6486
Content-Length: 512000
X-Object-Meta-PIN: 1234
```

No response body is returned. A status code of 201 (Created) indicates a successful write; status 412 (Length Required) denotes a missing Content-Length or Content-Type header in the request. If the MD5 checksum of the data written to the storage system does NOT match the (optionally) supplied ETag value, a 422 (Unprocessable Entity) response is returned. An example server response is:

```
HTTP/1.1 201 Created
Date: Thu, 07 Jun 2010 18:57:07 GMT
Server: Apache
ETag: d9f5eb4bba4e2f2f046e54611bc8196b
Content-Length: 0
Content-Type: text/plain; charset=UTF-8
```

Users can upload data without needing to know in advance the amount of data to be uploaded. Users can do this by specifying an HTTP header of Transfer-Encoding: chunked and not using a Content-Length header.

In one embodiment, objects can be copied server-side using a PUT request. In a first embodiment supporting PUT, the user performs a PUT to the new object (the target) location, but adds an "X-Copy-From" header to designate the source of the data. The header value should be the container and object name of the source object in the form of "/container/object". Also, the X-Copy-From PUT requests require a Content-Length header, even if it is zero (0).

In a second embodiment, objects are copied using a COPY request. The user performs a COPY to the existing object and includes the "Destination" header to specify the target of the copy. The header value is the container and new object name in the form of "/container/object".

In one embodiment, the content type of an object can be changed by using either PUT or COPY. The object is copied to itself and set the content type to a new value.

In one embodiment, DELETE operations on an object are used to permanently remove that object from the storage system (metadata and data). Deleting an object is processed immediately at the time of the request. Any subsequent GET, HEAD, POST, or DELETE operations will return a 404 (Not Found) error. For example:

```
DELETE /<api version>/<account>/<container>/<object> HTTP/1.1
Host: storage.example.com
X-Auth-Token: eaaafd18-0fed-4b3a-81b4-663c99ec1cbb
```

No response body is returned. A status code of 204 (No Content) indicates success, status 404 (Not Found) is returned when the object does not exist. For example:

```
HTTP/1.1 204 No Content
Date: Thu, 07 Jun 2010 20:59:39 GMT
Server: Apache
Content-Type: text/plain; charset=UTF-8
```

In an embodiment supporting either a copy by PUT or a COPY request and a DELETE request, a move can be accomplished by using COPY+DELETE. In a second embodiment, a MOVE request is supported, with semantics similar to COPY+DELETE.

In one embodiment, the destination container must exist before attempting the copy. To perform a move of the objects rather than a copy, a DELETE request is sent to the old object. A move is a COPY+DELETE. All metadata is preserved during the object copy. Note that an API user can set metadata on the request to copy the object (either the PUT or the COPY) and the metadata will overwrite any conflicting keys on the target (new) object. In one embodiment, an object can be copied to itself and set the content type to a new value.

In one embodiment, HEAD operations on an object are used to retrieve object metadata and other standard HTTP headers. Authorization headers can be added for access control purposes. For example:

```
HEAD /<api version>/<account>/<container>/<object> HTTP/1.1
Host: storage.example.com
X-Auth-Token: eaaafd18-0fed-4b3a-81b4-663c99ec1cbb
```

No response body is returned. Metadata is returned as HTTP headers. A status code of 200 (OK) indicates success; status 404 (Not Found) is returned when the object does not exist. The server response is:

```
HTTP/1.1 200 OK
Date: Thu, 07 Jun 2010 20:59:39 GMT
Server: Apache
Last-Modified: Fri, 12 Jun 2010 13:40:18 GMT
ETag: 8a964ee2a5e88be344f36c22562a6486
Content-Length: 512000
Content-Type: text/plain; charset=UTF-8
X-Object-Meta-Meat: Bacon
X-Object-Meta-Fruit: Bacon
X-Object-Meta-Veggie: Bacon
X-Object-Meta-Dairy: Bacon
```

In a further embodiment, POST operations against an object name are used to set and overwrite arbitrary key/value metadata. In one embodiment, the POST operation cannot be used to change any of the object's other headers such as Content-Type, ETag, etc. To distinguish particular headers, key names can be put into a particular namespace, such as X-Object-Meta-. A POST request will delete all existing metadata added with a previous PUT/POST. For example:

```
POST /<api version>/<account>/<container>/<object> HTTP/1.1
Host: storage.swiftdrive.com
X-Auth-Token: eaaafd18-0fed-4b3a-81b4-663c99ec1cbb
X-Object-Meta-Fruit: Apple
X-Object-Meta-Veggie: Carrot
```

No response body is returned. A status code of 202 (Accepted) indicates success; status 404 (Not Found) is returned when the requested object does not exist. The server response is:

```
HTTP/1.1 202 Accepted
Date: Thu, 07 Jun 2010 20:59:39 GMT
Server: Apache
Content-Length: 0
Content-Type: text/plain; charset=UTF-8
```

The mapping of these REST-based operations to SOAP, XML-RPC, CORBA, DCE/COM, or other distributed or remote procedure call protocols is straightforward.

Figure 11:
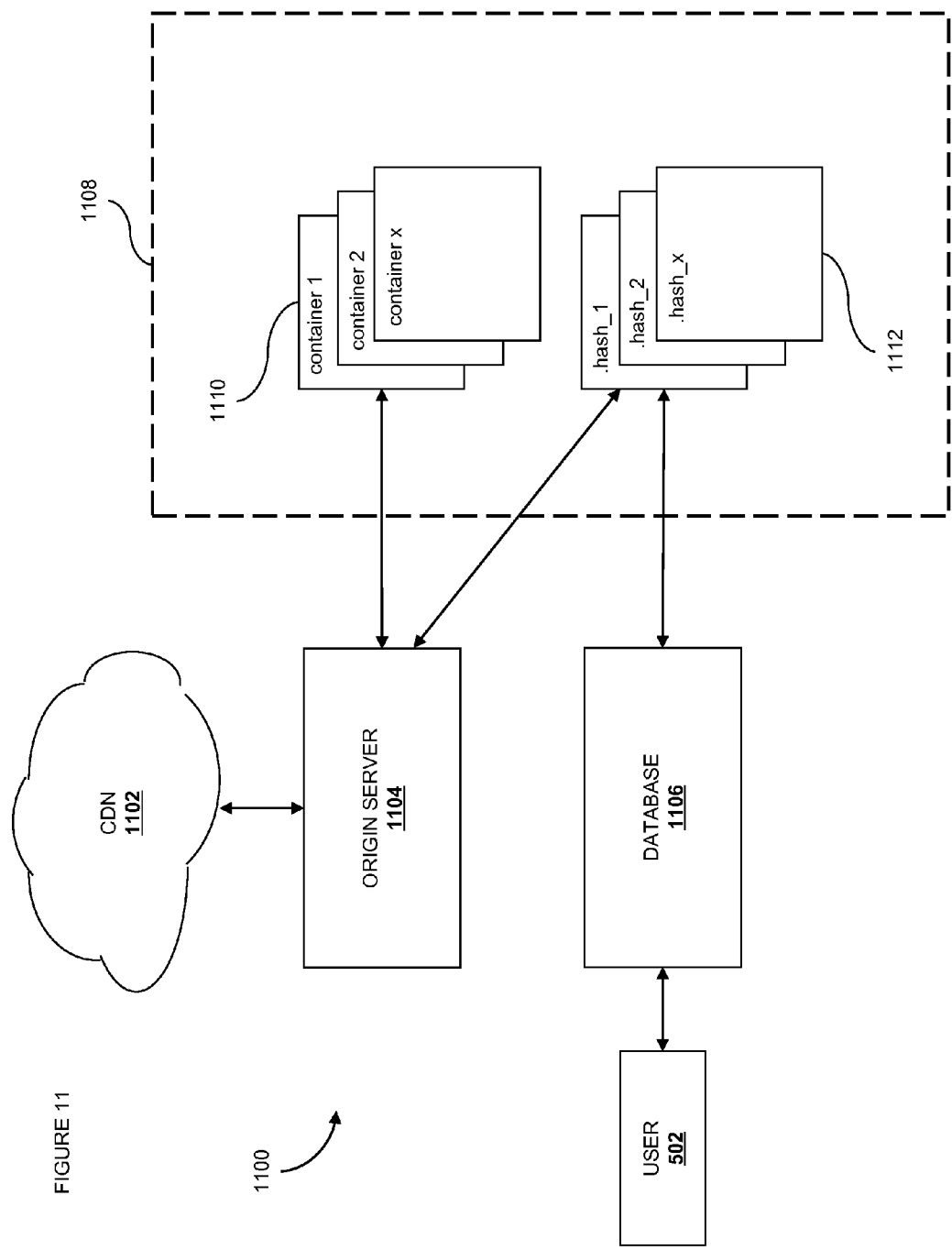
FIG. 11 is a schematic view of a CDN enabled cloud storage system according to one embodiment.

Turning now to FIG. 11, an embodiment of a content delivery network (CDN) enabled cloud storage system 1100 is shown according to various aspects of the present disclosure. The system 1100 is communicatively coupled to a CDN 1102. The system 1100 further includes an origin server 1104 communicatively coupled to the CDN 1102. The origin server 1104 is communicatively coupled to a database 1106. The origin server 1104 and database 1106 are communicatively coupled to a cloud storage area 1108. The cloud storage area 1108 includes a plurality of containers 1110 containing data associated with a plurality of hash containers 1112. The database 1106 is further communicatively coupled to the user 502 (discussed previously relative to FIG. 5).

System 1100 is operable to provide data from the plurality of containers 1110 stored in the cloud storage area 1108 to the CDN 1102. The CDN 1102 mirrors the data to multiple sites in its distributed network of computer in order to more efficiently serve the data to requesting clients. In one embodiment, the CDN 1102 is provided by a different party than the system 1100. For example, the CDN 1102 may be provided by Akamai, Limelight, Amazon, or another provider of content delivery services. In another embodiment, the CDN 1102 is provided by the same party as the system 1100.

The origin server 1104 is operable to receive requests from the CDN 1102 and return the appropriate data from the containers 1110 according to information in the hash containers 1112. In one embodiment, the origin server 1104 runs as a virtual machine inside a cloud computing system, according to the mechanisms and methods describes previously in the present disclosure. In another embodiment, the origin server is a separate system from the cloud computing system. In another embodiment, the origin server is implemented in a separate cloud computing system than the cloud computing system storing the plurality of containers 1110. In one embodiment, the origin server 1104 is a software program implemented in a programming language such as, for example, Python, C, C++, Javascript or Java. In another embodiment, the origin server 1104 is implemented in hardware such as, for example, a custom ASIC or a combination of off-the-shelf components. In another embodiment, the origin server 1104 is implemented as a combination of hardware and software. In another embodiment, the origin server 1104 is a modified version of a standard web server such as, for example, Apache, Microsoft IIS, nginx, Resin, or lighttpd. In one embodiment, the request from the CDN 1102 is formatted according to the Hypertext Transfer Protocol (HTTP). In another embodiment, the request from the CDN 1102 is formatted according to a proprietary protocol.

The database 1106 is operable to receive metadata about the plurality of containers 1110 from the client 502 for storage in the hash containers 1112. In one embodiment, the metadata for storage in the hash containers 1112 includes configuration information related to exposing the plurality of files to the CDN 1102. The hash containers 1112 serve to balance the storage of metadata across the cloud storage system 1108. The structure and operation of the hash containers 1112 will be described in greater detail in relation to FIG. 12.

In one embodiment, the database 1106 is a software program implemented in a programming language such as, for example, Python, C, C++, Javascript or Java. In another embodiment, the database 1106 is implemented in hardware such as, for example, a custom ASIC or a combination of off-the-shelf components. In another embodiment, the database 1106 is implemented as a combination of hardware and software. In another embodiment, the database 1106 is a modified version of a standard web server such as, for example, Apache, Microsoft IIS, nginx, GWS, Resin, or lighttpd. In another embodiment, the database 1106 is a standard database program known in the art such as, for example, Oracle, Informix, MySQL, or Microsoft SQL Server. In one embodiment, the request from the user 502 is formatted according to the Hypertext Transfer Protocol (HTTP). In another embodiment, the request from the user 502 is formatted according to a proprietary protocol. In another embodiment, the request contains an SQL query specifying the data to be returned.

Various embodiments of the CDN-integrated object server described relative to FIG. 11 have particular advantages.

In various existing solutions, one bottleneck is the analysis of authorization based upon a server name or object path. Some servers and HTTP endpoints need authorization, but others don't making the authorization process a relatively expensive portion of the HTTP processing. This is particularly true when using an authenticated object store such as one described relative to FIG. 5 or FIG. 6, where the typical use case is for authenticated access only. In one embodiment, the system 1100 is architected as middleware in an object storage HTTP processing pipeline. This allows it to intercept requests at any point in the process, which is important in allowing the CDN-enabled objects to avoid authentication. In another embodiment, the middleware intercepts requests to particular paths or endpoints, and redirects those as appropriate. This allows traffic to particular protected endpoints to have normal authentication, but allow for unauthenticated access to other paths.

A second common bottleneck is the use of a database to manage object metadata, such as TTLs, CDN policies, etc. In various existing solutions these are typically handled in a centralized database. In one embodiment of the presently-described system, however, the database 1106 is implemented as a series of small databases on a per-container basis, using a modified version of the container service 510 described above. The modified container service includes information about which objects are CDN enabled for a particular container. This allows the database 1106, while acting consistently, to be transparently distributed over as many containers (and container databases) as necessary, decreasing the load on any one particular container. Updates across users and containers are independent of each other and do not require coordinated action. This increases the parallelism and scalability of the origin server database 1106 to the same degree that the object storage system is itself parallel.

Figure 12:
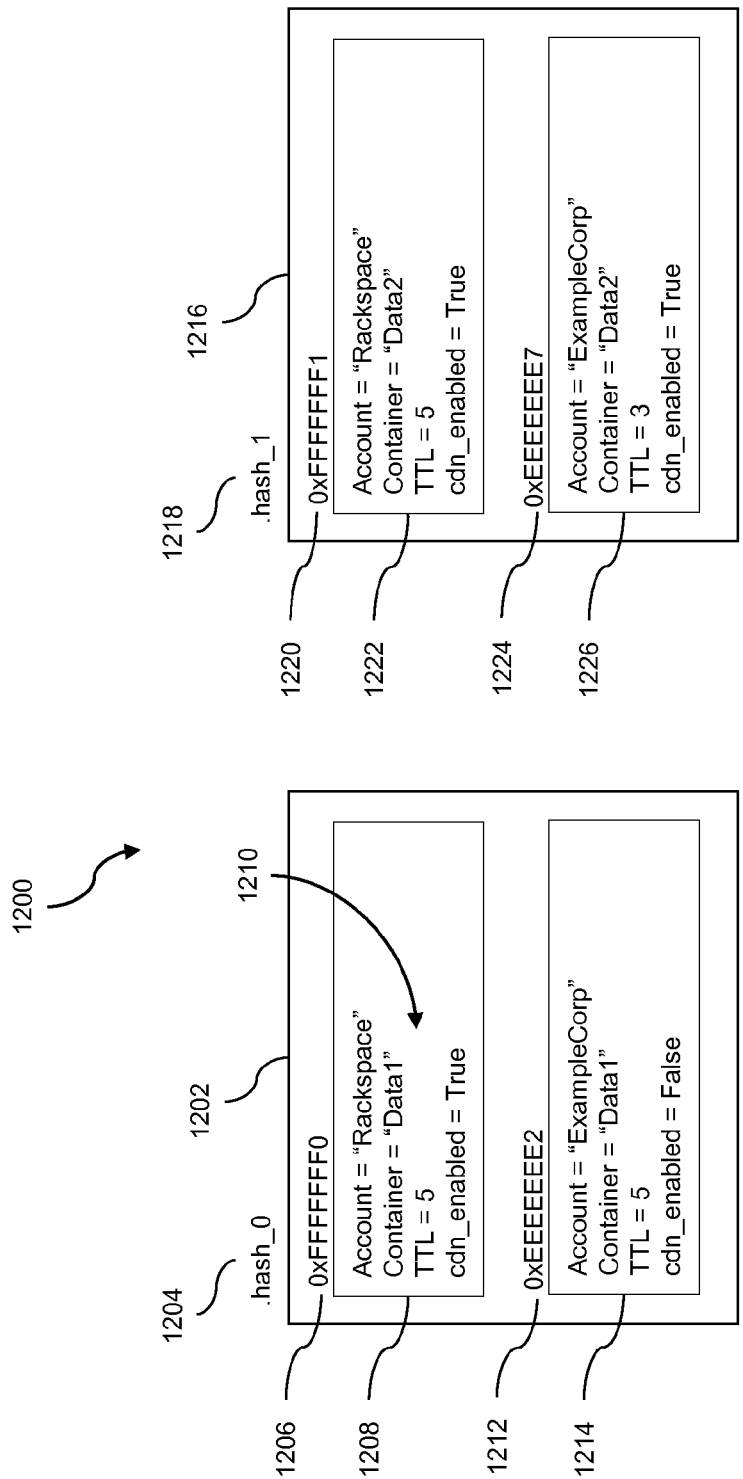
FIG. 12 is a schematic view of the hash container structure utilized by the CDN enabled cloud storage system according to one embodiment.

Turning now to FIG. 12, a system 1200 is shown including two hash containers 1202 and 1216. The hash containers 1202 and 1216 are identical to the hash containers 1112 described in FIG. 11, but here are presented in greater detail. Hash container 1202 includes a container name 1204 (".hash_0"), and two metadata containers 1208 and 1214. Metadata container 1208 includes a hash value 1206, and a plurality of metadata attributes 1210. Metadata container 1214 includes a hash value 1212. Hash container 1216 includes a container name 1218 (".hash_1"), and two metadata containers 1222 and 1226. Metadata container 1222 includes a hash value 1220, and metadata container 1226 includes a hash value 1224.

In the depicted embodiment, the hash values associated with each metadata container are 32-bit hashes computed from the plurality of metadata attributes contained in the associated metadata container. For example, metadata container 1208 includes the 32-bit hash value represented in hexadecimal as "FFFFFFF0," which corresponds to a decimal value of "4,294,967,280." This value is for example purposes only and is not computed from the plurality of metadata attributes 1210. In one embodiment, the hash value is computed by taking a cryptographic hash, such as an MD5 or SHA-1 hash, of the account and container attributes of the metadata container and a hash suffix value. In other embodiments, the hash value is randomly assigned by the cloud storage system 1108. In other embodiment, the user 502 specifies the hash value when requesting storage of the metadata attributes. In other embodiments, different sized hash values are used. For example, a 128-bit hash may be used for extra security, or a 16-bit hash may be used to decrease the length of the URL including the hash value.

In the depicted embodiment, the computed hash value is used to place metadata containers into an appropriate hash container. Hash containers 1202 and 1216 include metadata containers having hash values that have certain mathematical properties. In the depicted embodiment, the placement of each metadata container is determined by the result of the following computation: hash modulo 2. If the result is 0, the metadata container associated with the hash value is placed in the .hash_0 hash container (1202). If the result is 1, the metadata container associated with the hash value is placed in the .hash 1 hash container (1218). This computation has the result of distributing the metadata containers across the hash containers. For example, in the depicted embodiment, metadata container 1208 is included within the ".hash_0" hash container (1202) because its associated hash value 1206 modulo 2 is 0 (0xFFFFFFF0 mod 2=0). Metadata container 1214 is included within the ".hash_0" hash container (1202) because its associated hash value 1212 modulo 2 is 0 (0xEEEEEEE2 mod 2=0). Metadata container 1222 is included within the ".hash_1" hash container (1216) because its associated hash value 1220 modulo 2 is 1 (0xFFFFFFF1 mod 2=1). Metadata container 1226 is included within the ".hash_1" hash container (1216) because its associated hash value 1224 modulo 2 is 1 (0xEEEEEEE7 mod 2=1).

In embodiments including more hash containers, the computation is changed to hash modulo x, where x is the number of hash containers. For example, in an embodiment with 100 hash containers, the computation would be hash modulo 100. In other embodiments, a pseudo-random or random calculation is performed to determine the hash container in which to place a metadata container. In other embodiments, the cloud storage system 1108 determines the hash container in which to place a metadata container.

Figure 13:
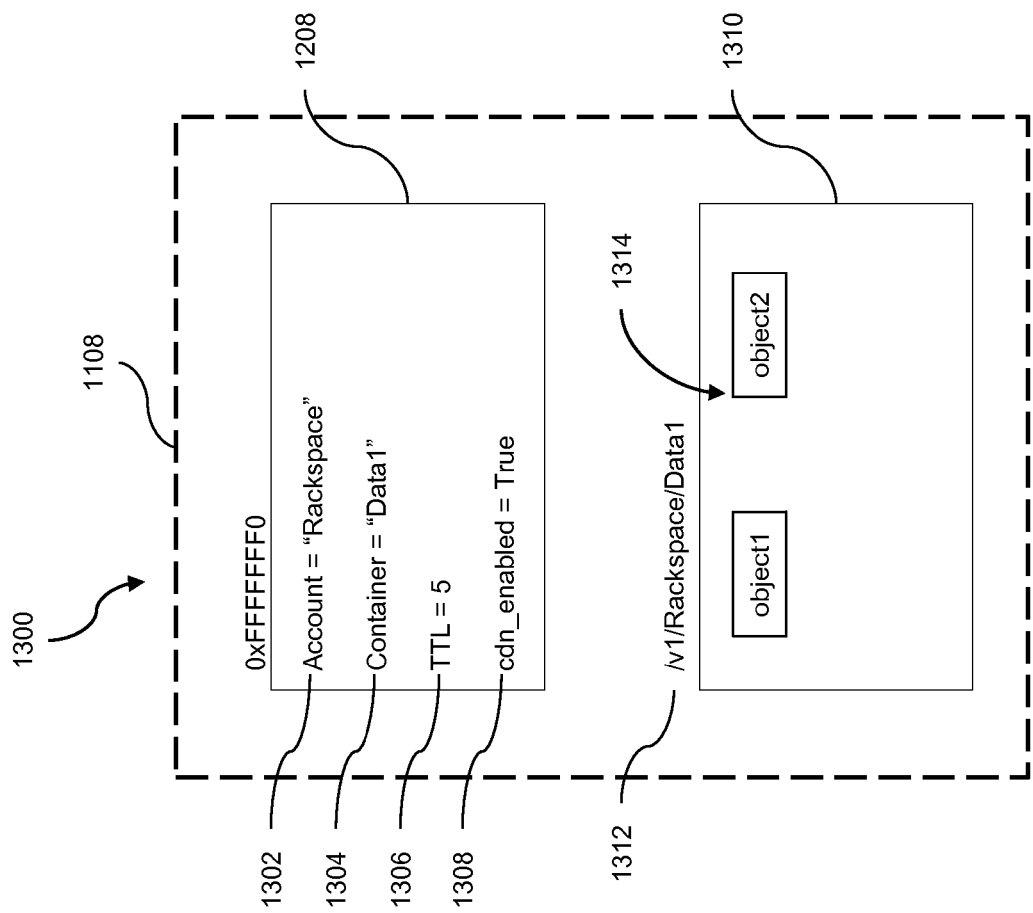
FIG. 13 is a schematic view of a hash container and an associated data container according to one embodiment.

Turning now to FIG. 13, system 1300 includes the metadata container 1208 and its corresponding data container 1310. The metadata container 1208 and the data container 1310 are stored within the cloud storage system 1108. The metadata container 1208 includes a plurality of metadata attributes. Account attribute 1302 specifies the account associated with the metadata container 1208. In the depicted embodiment, the account for metadata container 1208 is "Rackspace." Container attribute 1304 specifies the data container associated with the metadata container 1208. In the depicted embodiment, the account for metadata container 1208 is "Data1." Time-to-live attribute 1306 specifies the amount of time data associated with metadata container 1208 is to be cached by the CDN 1102. In one embodiment, the time-to-live attribute 1306 attribute and others are returned to the CDN 1102 as headers in an HTTP response. The CDN 1102 will then requery the data from the origin server after the specified amount of time. In one embodiment, the time-to-live attribute 1306 specifies a number of seconds between requeries. In another embodiment, the time-to-live attribute 1306 specifies a number of minutes between requeries. CDN-enabled attribute 1308 specifies whether the associated data container 1310 should be exposed to CDN 1102. In one embodiment, an error such as "404 Not Found" is returned to the CDN 1102 if the CDN-enabled attribute 1308 is set to False. In other embodiments, the metadata container 1208 includes additional attributes such as, for example, information related to geographic areas in which the CDN provider 1102 should or should not cache the associated data.

The data container 1310 contains the actual data to be exposed to the CDN 1102, in the form of a plurality of objects 1314. The data container 1310 is accessed in the cloud storage system 1108 via a path 1312. The system generates this path by examining the hash value in a received request and consulting the corresponding metadata container. In one embodiment, the system receives a request for data from the CDN 1102 including a URL. The URL includes a hash value and possibly an object name. The system parses the URL to separate the hash value and the object name. The system performs a modulo operation on the hash value to find the appropriate hash container and retrieves the metadata container 1208 corresponding to the hash value. If the CDN-enabled attribute 1308 is set to True, the system accesses the data container 1310 by constructing the path corresponding to the metadata container 1208. In the depicted embodiment, this is performed by appending the account attribute 1302, followed by a "/", followed by the container attribute 1304, to the string identifying a version number (here "/v1/") in order to form the path "/v1/Rackspace/Data1". In other embodiments, the path 1312 corresponds to the storage technology used to store the data container. In another embodiment, the path 1312 is replaced by a network address such as an IP address or URL. In another embodiment, the path 1312 is stored in full form in the metadata container 1208. In one embodiment, if the request includes an object identifier, this is appended to the path and that object is returned to the CDN 1102. If the request does not include an object identifier, a list of the objects contained in the container corresponding to the path is returned.

Figure 14:
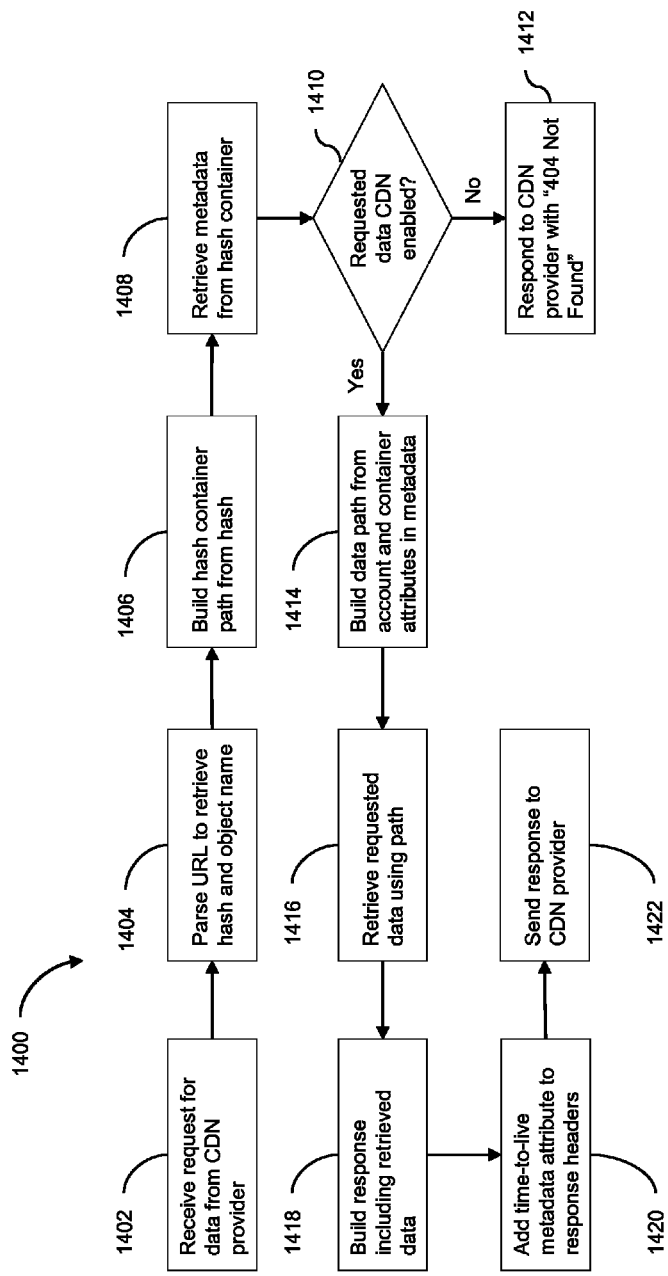
FIG. 14 is a flow chart illustrating an embodiment of a method for exposing data to a CDN provider according to one embodiment.

Turning now to FIG. 14, a flowchart is shown illustrating a method 1400 for exposing data to a CDN provider according to various aspects of the present disclosure. The method begins at step 1402 where a request for data is received from a CDN provider. In one embodiment, the CDN provider is a commercial CDN provider such as Akamai, Rackspace, Limelight, or Amazon. In another embodiment, the CDN provider is an internal subsystem of a cloud storage system.

At step 1404, the URL contained in the received request is parsed to retrieve the hash and object name. In one embodiment, the request for data from the CDN provider is an HTTP GET request. In other embodiments, the request for data from the CDN provider is an HTTP HEAD request specifying only a hash in the URL. In such an embodiment, the method will return a list of URLs of all objects present in the specified hash container. At step 1406, a path for a hash container is built from the hash parsed from the URL. In one embodiment, the hash container path is of the form "/v1/<origin_account>/.hash_<hash mod num containers>/ <hash>", where <origin_account> is an account dedicated to the storage of origin server metadata, and where <hash mod num containers> is the modulo operation previously discussed. At step 1408, the metadata stored in the hash container is retrieved. At step 1410, the metadata is checked to determine whether the requested data is CDN enabled. In one embodiment, this check involves checking if the "cdn enabled" attribute from the metadata is set to True. If the requested data is not CDN enabled, the method 1400 proceeds to step 1412, where an HTTP "404 Not Found" response is returned to the CDN provider. In another embodiment, a different HTTP status code, such as 303 or 501, is returned to the CDN provider. In embodiments utilizing protocols other than HTTP, an appropriate response in that protocol is sent to indicate that the data is not available to the CDN provider.

If the requested data is CDN enabled, the method 1400 continues to step 1414, where the data path is built from the account and container attributes stored in the metadata. In another embodiment, the data path is stored pre-built in the hash container, and no building step is necessary. In another embodiment, the path is replaced by an IP address or other network identifier of a host storing the data. At step 1416, the requested data is retrieved from the data path. At step 1418, a response is built including the received data. In one embodiment, this response is an "HTTP 200" message. In another embodiment, the response includes JSON formatted data attached to an HTTP response. In another embodiment, the response includes XML formatted data. At step 1420, the time-to-live attribute from the metadata is added to the headers of the response message. In another embodiment, other attributes from the metadata are added to the headers of the response message such as a purge frequency, geography specific CDN configuration information, or any other attribute stored in the metadata. In another embodiment, the metadata attributes are included as part of the body of the response message rather than as part of the headers of the message. At step 1422, the response is sent to the CDN provider.

CDN API

With the information above, the container API discussed above can be extended to allow the CDN-enabling of any particular container in the distributed object system. The CDN management interface is exposed on an authenticated path (such as '/cdnadmin/') or on an authorized hostname (such as 'origin_db.com').

To CDN-enable a container, perform a container PUT as describe above, but add the header Host: origin_db.com
to the request. Subsequent HEAD request you will see the CDN URL returned as a header. For example, using an HTTP command line tool such as curl:

Put container in the object store:

```
curl -i -H "X-Auth-Token: $AUTH_TOKEN" \
http://objectserver.com/v1/$AUTH_USER/pub -XPUT
```

Put object in container:

```
curl -i -H "X-Auth-Token: $AUTH_TOKEN" \
http://objectserver.com /v1/$AUTH_USER/pub/file.html -XPUT -d
'<html><b>It Works!!</b></html>'
```

CDN-enable the container:

```
curl -i -H "X-Auth-Token: $AUTH_TOKEN" \
http://objectserver.com/v1/$AUTH_USER/pub -XPUT -H 'Host:
origin_db.com'
```

Make origin request:

```
curl http://127.0.0.1:8080/file.html -H \
'Host: c0cd095b4ec76c09a6549995abb62558.r56.origin_cdn.com'
```

The common container and object API operations described above are also supported, allowing for management of objects and CDN containers. Metadata relating to an individual CDN system or deployment is managed at the container level and can be arbitrarily set using custom headers. Depending on the embodiment, CDN metadata is stored either in extended fields in a container database or as attributes on the object itself. In one preferred embodiment, per-object information is stored on the object, whereas per-container information is stored in the container database.

Figure 15:
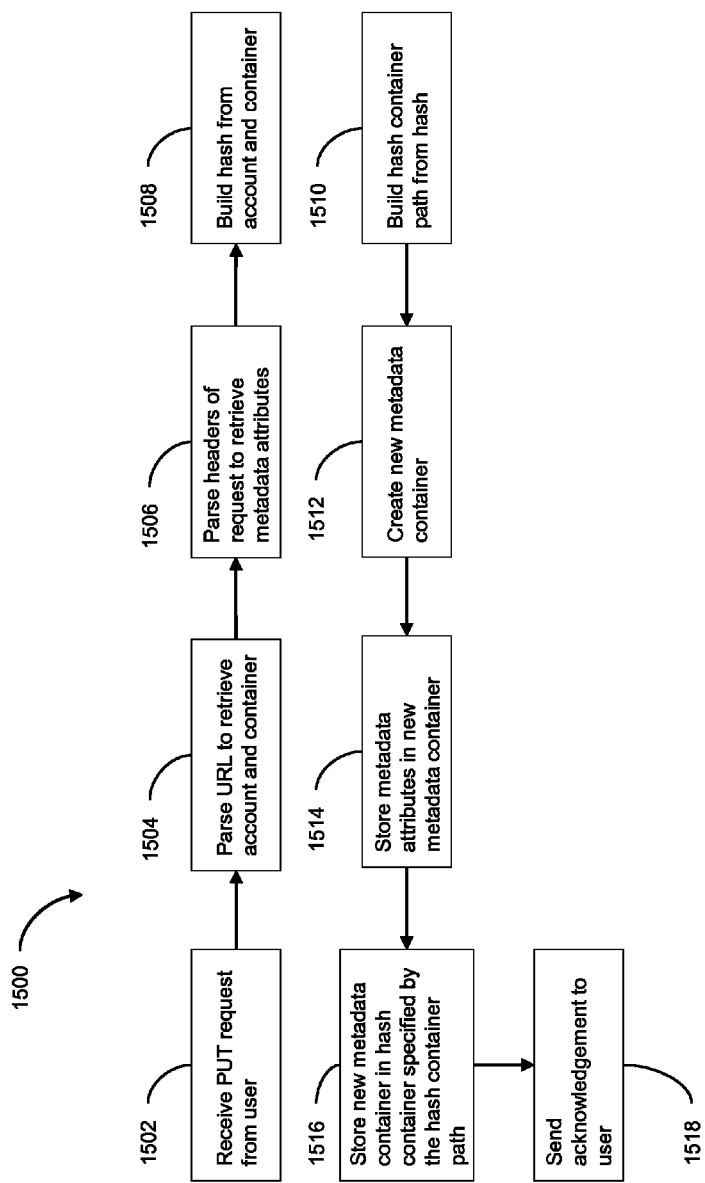
FIG. 15 is a flow chart illustrating an embodiment of a method for receiving CDN configuration metadata from a user according to one embodiment.

Turning now to FIG. 15, a flowchart is shown illustrating a method 1500 for receiving CDN configuration metadata from a user according to various aspects of the present disclosure. At step 1502, a PUT request is received from a user. In another embodiment, a POST request is received from the user, and the method operates in the same manner except an error is returned if the resource attempting to be posted to does not exist. At step 1504, the URL from the request is parsed to retrieve the account and container on which the CDN configuration metadata should be updated. At step 1506, the headers of the request are parsed to retrieve the metadata attributes and associated values to be set. In another embodiment, the metadata attributes are included as part of the message body rather than in the message headers. In another embodiment, the metadata attributes are formatted as JSON. In another embodiment, the metadata attributes are formatted as XML. At step 1508, a hash is built from the account and container parsed from the URL. In one embodiment, the hash value is computed by taking an MD5 hash of the account and container attributes and a hash suffix value. In another embodiment, the hash value is randomly assigned by the cloud storage system. In another embodiment, the request specifies the hash value when requesting storage of the metadata attributes.

At step 1510, a hash container path is built from the hash. In one embodiment, the hash container path is of the form "/v1/<origin_account>/.hash_<hash mod num containers>/<hash>", where <origin_account> is an account dedicated to the storage of origin server metadata, and where <hash mod num containers> is the modulo operation previously discussed. At step 1512, a new metadata container is created. At step 1514, the metadata attributes parsed in step 1506 are stored in the new metadata container. At step 1516, the metadata container is stored in the hash container specified by the hash container path built in step 1510. In another embodiment, the step of storing the new metadata container in the hash container is omitted, because the step of creating the new metadata container (1512) creates an empty container in the hash container specified by the hash container path, and the metadata attributes are stored into this empty container at step 1514. At step 1518, an acknowledgement is sent to the user.

Other embodiments according to aspects of the present disclosure may deviate from the general structure and operation described above without deviating from the scope of the present disclosure. In one embodiment, database functionality for storing the metadata is implemented using an indirection mechanism, so that the metadata attributes are stored in the indirection block pointing to the data in question. In another embodiment, the stored metadata applies system-wide. In other embodiments, the stored metadata applies to a single account and container combination. In other embodiments, the stored metadata applies to a specific object stored in the cloud storage system. In one embodiment, the CDN provider requesting the data from the cloud storage system is replaced by different requesting entity including, for example, a user, another cloud computing system, a web server, a caching engine, a database, or a backup system. In another embodiment, the origin server and database are integrated as a single component providing the functionality of both components. Other embodiments include authentication mechanisms for the user and/or CDN provider including, for example, an HMAC signed secret embedded in a request URL. In another embodiment, the metadata received by the database is received from a requesting entity other than a user, for example another cloud computing system, a web server, a caching engine, a database, a backup system, a CDN provider, or a system administrator.

With each service instrumented and provided with the plugin-based architecture as described above, user-based modification of the cloud system is possible while still maintaining multi-tenant security and availability. Although illustrative embodiments have been shown and described, a wide range of modification, change and substitution is contemplated in the foregoing disclosure and in some instances, some features of the embodiments may be employed without a corresponding use of other features. In particular, the use of multiple plugin-based services to modify the working of an individual cloud computing system or an individual group of resources is contemplated. Accordingly, it is appropriate that the appended claims be construed broadly and in a manner consistent with the scope of the embodiments disclosed herein.

What is claimed is:

1. A method for receiving content delivery network metadata for data stored in a cloud computing system, the method comprising:
   receiving a request from a user to expose data stored in the cloud computing system to a content delivery network;
   parsing the request to retrieve one or more metadata attributes and associated values, including an identification of an account and a container on which content delivery network metadata is to be updated;

generating a hash value from the identification of the account and the container;

storing the retrieved metadata attributes and associated values in a metadata container, the metadata container stored in the cloud computing system; and sending an acknowledgement to the requesting user.

2. The method of claim 1, wherein receiving the request from a user includes receiving a request formatted according to the Hypertext Transfer Protocol (HTTP).

3. The method of claim 1, wherein the metadata attributes include one or more attributes selected from the group consisting of: an account, a container, a time-to-live, a flag indicating whether the data is content delivery network enabled, a purge frequency, a list of geographic regions in which the content delivery network provider caches the data, a list of geographic regions in which the content delivery network provider does not cache the data, a priority, and an identifier indicating the associated data.

4. The method of claim 3, wherein the flag indicating whether the data is content delivery network enabled is a Boolean flag.

5. The method of claim 1, wherein the request from the user is a PUT request.

6. The method of claim 1, wherein parsing the request includes parsing a header of the request.

7. The method of claim 1, the method further comprising generating a hash container path from the hash value.

8. The method of claim 7, the method further comprising performing a mathematical operation on the hash value to determine the associated hash container.

9. The method of claim 7, the method further comprising creating an empty metadata container in the hash container specified by the hash container path.

10. The method of claim 1, further comprising creating a new metadata container, and wherein the storing further includes storing the retrieved metadata attributes and associated values in the created metadata container.

11. The method of claim 1, wherein the request from the user further includes authentication information for the user.

12. A system comprising:
a storage area configured to store data, the storage area being implemented in a cloud computing system;
a database configured to receive and store metadata corresponding to the data, the database being implemented in the cloud computing system; and
an origin server configured to:
receive a request to expose data stored in the storage area, the request including a configuration attribute associated with the data,
create a metadata container in the storage area, the metadata container including the configuration attribute,
generate a hash value corresponding to the metadata container based on the configuration attribute,
store the metadata container in the storage area in a hash container associated with the hash value, and
expose the data associated with the configuration attribute to the content delivery network provider, wherein exposing the data is based at least on a determination which includes:
checking a boolean flag for indicating that the content is to be exposed, and
determining, based on an indirection block, whether the data is configured to be exposed to the content delivery network.

13. The system of claim 12, wherein the step of receiving the request includes receiving the request formatted according to the Hypertext Transfer Protocol (HTTP).

14. The system of claim 12, wherein receiving the request to expose data including the configuration attribute associated with the data includes receiving an attribute selected from the group consisting of: an account, a container, a time-to-live, a flag indicating whether the data is content delivery network enabled, a purge frequency, a list of geographic regions in which the content delivery network provider should cache the data, a list of geographic regions in which the content delivery network provider should not cache the data, a priority, and an identifier indicating the associated data.

15. The system of claim 12, the origin server further configured to:
perform a mathematical operation on the hash value to determine the associated hash container.

16. The system of claim 12, wherein the step of exposing the data associated with the configuration attribute to the content delivery network provider includes returning a response to the content delivery network provider including the data and a configuration attribute.

17. The system of claim 12, wherein the step of generating the hash value includes generating the hash value using an algorithm selected from the group consisting of: message digest 5 (MD5), secure hash algorithm 1 (SHA-1), and secure hash algorithm 2 (SHA-2).

18. A system comprising:
a storage area configured to store data, the storage area being implemented in a cloud computing system;
a database configured to receive and store metadata corresponding to the data, the database being implemented in the cloud computing system; and
an origin server configured to:
receive a request from a user to expose data stored in the cloud computing system to a content delivery network;
parse the request to retrieve one or more metadata attributes and associated values including an identification of an account and a container on which content delivery network metadata is to be updated;
generate a hash value from the identification of the account and the container;
store the retrieved metadata attributes and associated values in a metadata container, the metadata container stored in the cloud computing system; and
send an acknowledgement to the requesting user.

* * * * *